United States Patent
Ryu et al.

(10) Patent No.: US 12,117,901 B2
(45) Date of Patent: Oct. 15, 2024

(54) MEMORY DEVICE, A CONTROLLER FOR CONTROLLING THE SAME, A MEMORY SYSTEM INCLUDING THE SAME, AND AN OPERATING METHOD OF THE SAME

(71) Applicant: SAMSUNG ELECTRONICS CO., LTD., Suwon-si (KR)

(72) Inventors: Yesin Ryu, Seoul (KR); Sunggi Ahn, Jinju-si (KR); Jaeyoun Youn, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/096,053

(22) Filed: Jan. 12, 2023

(65) Prior Publication Data

US 2023/0144712 A1    May 11, 2023

Related U.S. Application Data

(62) Division of application No. 17/388,243, filed on Jul. 29, 2021, now Pat. No. 11,604,693.

(30) Foreign Application Priority Data

Dec. 23, 2020  (KR) .................... 10-2020-0181670

(51) Int. Cl.
G06F 11/10       (2006.01)
(52) U.S. Cl.
CPC .................. *G06F 11/106* (2013.01)

(58) Field of Classification Search
CPC ..................................................... G06F 11/106
See application file for complete search history.

(56) References Cited

U.S. PATENT DOCUMENTS

| | | |
|---|---|---|
| 10,037,244 B2 | 7/2018 | Chung et al. |
| 10,705,908 B2 | 7/2020 | Chung et al. |
| 2005/0162182 A1 | 7/2005 | Ong |
| 2007/0022244 A1 | 1/2007 | Kimmery |
| 2011/0029807 A1 | 2/2011 | Fry et al. |
| 2014/0304566 A1 | 10/2014 | Henderson et al. |
| 2015/0363120 A1 | 12/2015 | Chen et al. |
| 2016/0246679 A1 | 8/2016 | Kim et al. |
| 2016/0372211 A1* | 12/2016 | Lin ................. G11C 29/36 |
| 2017/0060681 A1 | 3/2017 | Halbert et al. |
| 2019/0073261 A1 | 3/2019 | Halbert et al. |
| 2019/0272213 A1 | 9/2019 | Brown |
| 2020/0019462 A1 | 1/2020 | Prather et al. |
| 2020/0210267 A1 | 7/2020 | Rooney et al. |
| 2020/0210278 A1 | 7/2020 | Rooney et al. |
| 2021/0142860 A1* | 5/2021 | Song ................. G11C 29/44 |
| 2022/0197739 A1 | 6/2022 | Ryu et al. |

* cited by examiner

*Primary Examiner* — Thien Nguyen
(74) *Attorney, Agent, or Firm* — F. CHAU & ASSOCIATES, LLC

(57) ABSTRACT

A memory device including: a memory cell array including a plurality of memory cells disposed at intersections of wordlines and bitlines; an error correction circuit configured to read data from the memory cell array and to correct an error in the read data; and an error check and scrub (ECS) circuit configured to perform a scrubbing operation on the memory cell array, wherein the ECS circuit includes: a first register configured to store an error address obtained in the scrubbing operation; and a second register configured to store a page offline address received from an external device.

12 Claims, 20 Drawing Sheets

MEMORY DEVICE, A CONTROLLER FOR CONTROLLING THE SAME, A MEMORY SYSTEM INCLUDING THE SAME, AND AN OPERATING METHOD OF THE SAME

CROSS-REFERENCE TO RELATED APPLICATIONS

This application is a divisional of U.S. patent application Ser. No. 17/388,243 filed on Jul. 29, 2021, which claims priority under 35 U.S.C. § 119 to Korean Patent Application No. 10-2020-0181670 filed on Dec. 23, 2020 in the Korean Intellectual Property Office, the disclosures of which are incorporated by reference herein in their entireties.

TECHNICAL FIELD

The present disclosure relates to a memory device, a controller for controlling the same, a memory system including the same, and an operating method of the same.

DISCUSSION OF RELATED ART

Semiconductor memory is a digital electronic semiconductor device used for digital data storage, such as computer memory. In general, a dynamic random access memory (DRAM), a type of semiconductor memory, has volatile data characteristics. For example, the DRAM may lose data in the absence of power. In addition, even in the case of a normal cell, validity of the data may not be ensured over time. Accordingly, data stored in a DRAM cell is refreshed every predetermined refresh cycle. For example, the DRAM may employ an external memory refresh circuit that periodically rewrites the data in its capacitors, restoring them to their original charge. As a DRAM cell decreases in size, data retention characteristics may deteriorate. To compensate for this, refreshes should be performed more frequently: however, additional refreshes result in increased power consumption. In addition, as a DRAM cell shrinks, single-bit errors or multi-bit errors may occur. Therefore, an error may not be corrected by an error correction circuit or the probability of a physical error (for example, a hard failure) may be increased.

SUMMARY

According to an example embodiment of the present disclosure, there is provided a memory device including: a memory cell array including a plurality of memory cells disposed at intersections of wordlines and bitlines; an error correction circuit configured to read data from the memory cell array and to correct an error in the read data; and an error check and scrub (ECS) circuit configured to perform a scrubbing operation on the memory cell array, wherein the ECS circuit includes: a first register configured to store an error address obtained in the scrubbing operation; and a second register configured to store a page offline address received from an external device.

According to an example embodiment of the present disclosure, there is provided a memory device including: a memory cell array including a plurality of memory cells disposed at intersections of wordlines and bitlines; an error correction circuit configured to read data from the memory cell array and to correct an error in the read data; and an ECS circuit configured to perform a scrubbing operation on the memory cell array, wherein the ECS circuit includes: a first register configured to store an error address; and an ECS logic configured to perform the scrubbing operation while operating an ECS address counter from the error address in a first direction or a second direction.

According to an example embodiment of the present disclosure, there is provided an operating method of a memory device, the operating method including: receiving ECS mode information from a controller; and operating an ECS address counter, in response to the ECS mode information, in a reverse direction to perform a scrubbing operation.

According to an example embodiment of the present disclosure, there is provided an operating method of a memory device, the operating method including: receiving ECS mode information from a controller; receiving a page offline address from the controller; performing a scrubbing operation in response to the ECS mode information; and reporting an error address detected in the scrubbing operation to the controller.

According to an example embodiment of the present disclosure, there is provided a controller including: a map management device configured to manage a mapping relationship between a logical address and a physical address of a memory device and to generate a page offline address using an error address received from the memory device; and an ECS mode management device configured to manage an ECS mode of the memory device, wherein the ECS mode management device transmits ECS mode information and the page offline address to the memory device.

According to an example embodiment of the present disclosure, there is provided a memory system including: a memory device; and a controller configured to control the memory device, to receive an error address from the memory device, and to transmit a mapped-out page offline address to the memory device, wherein the memory device includes a memory cell array, an error correction circuit configured to read data from the memory cell array and to correct an error in the read data, and an ECS circuit including a first register, configured to perform a scrubbing operation on the memory cell array and to store an error address detected in the scrubbing operation, and a second register configured to store the page offline address from the controller.

BRIEF DESCRIPTION OF THE DRAWINGS

The above and other features of the present disclosure will be more clearly understood from the following detailed description, taken in conjunction with the accompanying drawings.

DETAILED DESCRIPTION OF THE EMBODIMENTS

Hereinafter, example embodiments of the present disclosure will be described with reference to the accompanying drawings.

In general, on-die error correction code (ECC) technology has been used to correct an error in a memory device. The term "on-die ECC" may refer to the detection and correction of errors in an array of a memory device. Although a memory device internally processes errors with on-die ECC, errors may accumulate in a system, but such error information is not transmitted to the system.

Recently, an error check and scrub (ECS) mode has been introduced to memory devices. The ECS mode enables a memory device of perform ECC and count errors. For example, in an ECS mode, a memory device may internally correct an error bit of a memory cell array, may store error information (for example, an error address) corresponding thereto and report the error information stored in an external system. Such an ECS function may increase stability and serviceability within the system, and may detect potential errors in early stages and thus prevent downtime.

Figure 1:
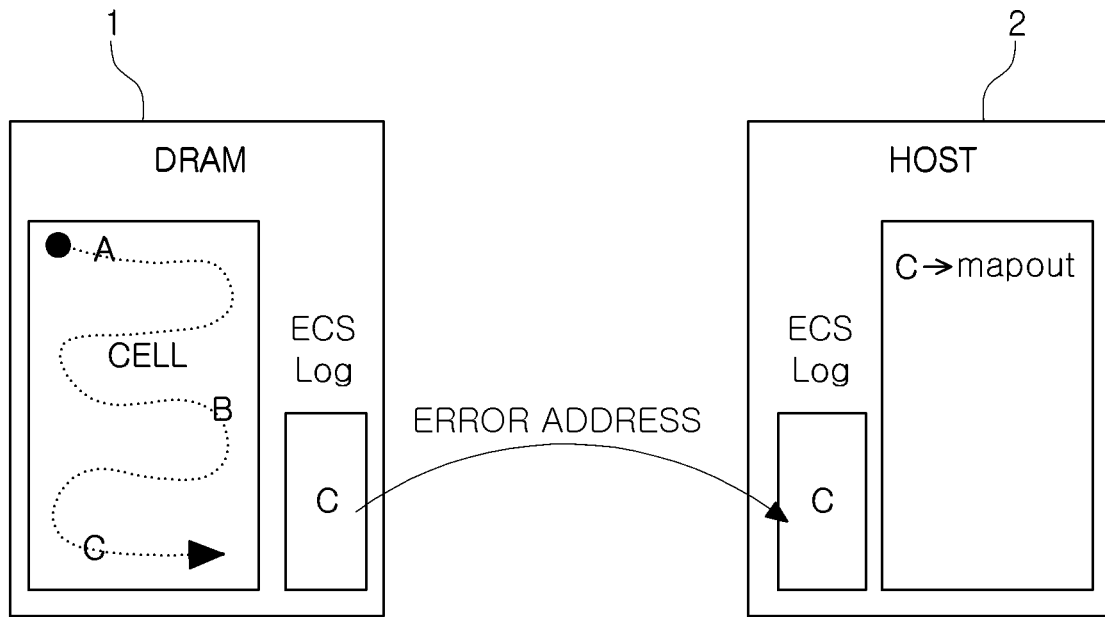
FIG. 1 is a diagram illustrating a reporting process of error information of a conventional host system.

FIG. 1 is a diagram illustrating a reporting process of error information of a conventional host system. Referring to FIG. 1, a memory device (DRAM) 1 may perform a scrubbing operation on a cell array in an ECS mode.

The memory device 1 may store a final error address (for example, C) according to the scrubbing operation in an ECS log register. For example, according to the DDRx (x is and integer of 5 or more) Specification, a single error address is stored for each memory chip. In addition, according to the High Bandwidth Memory (HBM) Specification, a single error address is stored for each pseudo channel.

A host (HOST) 2 may accesses the ECS log register from the memory device 1 to obtain an error address C. The host 2 may map out an entry, corresponding to the error address C obtained from a mapping table, using the error address C stored in the ECS log register. A conventional host system processes page retirement for the error address C; however, the host 2 does not transmit such information to the memory device 1. As a result, the memory device 1 may repeatedly transmit the error address C, which has already been page-retirement-processed in the ECS mode, to the host 2. In the process illustrated in FIG. 1, the possibility of error processing for another error address (for example, A or B) is not high.

In a memory system according to an example embodiment of the present disclosure and an operating method of the memory system, mapped-out information may be transmitted from a host to a memory device and scheduling of a scrubbing operation may be diversified in an ECS mode. Thus, the degree of freedom in reporting error information may be increased.

Figure 2:
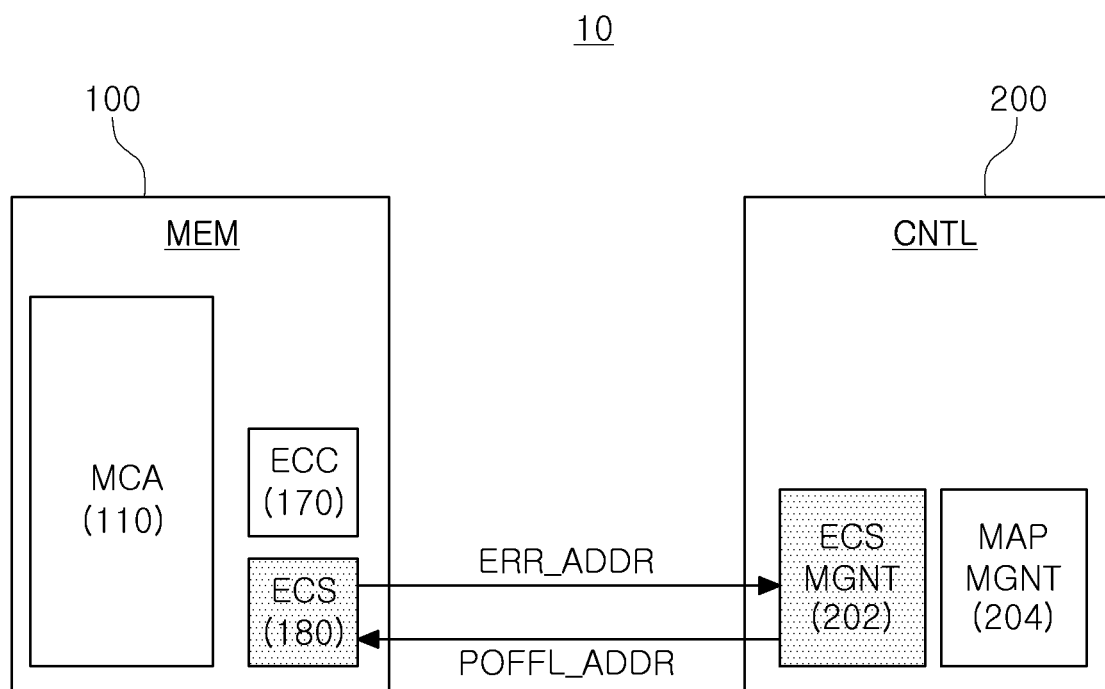
FIG. 2 is a schematic diagram of a memory system according to an example embodiment of the present disclosure.

FIG. 2 is a schematic diagram of a memory system 10 according to an example embodiment of the present disclosure. Referring to FIG. 2, the memory system 10 may include a memory device (MEM) 100 and a controller (CNTL) 200 for controlling the memory device 100.

The memory device 100 may be configured to store data received from the controller 200 or to output read data to the controller 200. The memory device 100 may be used as an operation memory, a working memory, or a buffer memory in a computing system. In an example embodiment of the present disclosure, the memory device 100 may be a single in-line memory module (SIMM), a dual in-line memory module (DIMM), a small-outline DIMM (SODIMM), an unbuffered DIMM (UDIMM), a fully-buffered DIMM (FB-DIMM), a rank-buffered DIMM (RBDIMM), a mini-DIMM, a micro-DIMM, a registered DIMM (RDIMM), or a load-reduced DIMM (LRDIMM).

In an embodiment of the present disclosure, the memory device 100 may be a volatile memory. For example, the volatile memory may include at least one of a dynamic random access memory (DRAM), a synchronous DRAM (SDRAM), a double data rate SDRAM (DDR SDRAM), a low power double data rate SDRAM (LPDDR SDRAM), a graphics double data rate SDRAM (GDDR SDRAM), a Rambus DRAM (RDRAM), and a static RAM (SRAM). In another embodiment of the present disclosure, the memory device 100 may be a nonvolatile memory. For example, the nonvolatile memory may include one of a NAND flash memory, a phase-change RAM (PRAM), a magneto-resistive RAM (MRAM), a resistive RAM (ReRAM), a ferroelectric RAM (FRAM), and a NOR flash memory.

In addition, the memory device 100 may include a serial presence detection (SPD) chip. The SPD chip may store information on characteristics of the memory device 100. In an embodiment of the present disclosure, the SPD chip may store memory device information such as a module type, an operating environment, a line arrangement, a module configuration, and a storage capacity of the memory device 100. In an embodiment of the present disclosure, the SPD chip may include a programmable read-only memory, for example, an electrically erasable programmable read only memory (EEPROM).

In addition, the memory device (MEM) 100 may include a memory cell array (MCA) 110, an error correction circuit (ECC) 170, and an ECS circuit 180.

The memory cell array (MCA) 110 may include a plurality of memory cells storing data. In an embodiment of the present disclosure, each of the plurality of memory cells may include a volatile memory cell such as a dynamic random access memory (DRAM) cell. In another embodiment of the present disclosure, each of the plurality of memory cells may include a nonvolatile memory cell such as a flash memory cell, a phase change random access memory (PRAM) cell, a resistive random access memory (RRAM) cell, a magnetic random access memory (MRAM) cell, and a ferroelectric random access memory (FRAM) cell.

The error correction circuit (ECC) 170 may be configured to read data from the memory cell array 110 and to correct an error in the read data.

The ECS circuit 180 may be configured to perform a scrubbing operation according to a predetermined scheduling scheme in an ECS mode. For example, the ECS circuit 180 may be configured to read data sequentially from a page corresponding to a received address from the memory cell array 110, correct an error in the read data, and store the corrected data in the memory cell array 110.

In an embodiment of the present disclosure, the predetermined scheduling may be performed in the memory cell array 110 in a forward direction while counting up from the received address. In another embodiment of the present disclosure, the predetermined scheduling may be performed in the memory cell array 110 in a reverse direction while counting down from the received address. In an embodiment of the present disclosure, the predetermined scheduling may be performed in the memory cell array 110 by randomly counting up from a received address. In an embodiment of the present disclosure, according to the predetermined scheduling, a scrubbing operation may be stopped in a page corresponding to a specific address, and then, may be resumed from a next address.

In addition, the ECS circuit 180 may be configured to store an error-corrected address ERR_ADDR and output the stored error address ERR_ADDR to the controller 200 according to a request of the controller 200.

In addition, the ECS circuit 180 may receive a mapped-out (or page off-lined address; hereinafter referred to as a "page offline address") POFFL_ADDR from the controller 200, and may compare an error address detected in the scrubbing operation with the page offline address POFFL_ADDR received from the controller 200. When the compared addresses are the same, the ECS circuit 180 may not store an error address. For example, the page offline address POFFL_ADDR transmitted from the controller 200 may be removed in the ECS mode.

The controller 200 may be configured to control the memory device 100. In addition, the controller 200 may include an ECS mode management unit 202 and a map management unit 204.

The ECS mode management unit 202 may be configured to transmit the ECS mode to the memory device 100, request that the memory device 100 outputs an error address (ECS) according to the ECS mode, or to transmit a page offline address POFFL_ADDR to the memory device 100.

The map management unit 204 may be configured to manage a map table for mapping a logical address and a corresponding physical address of the memory device 100. For example, the map management unit 204 may page-offline a corresponding address using the error address ERR_ADDR received from the memory device 100, or may be used in post package repair (PPR), soft PPR, or hard PPR.

In an embodiment of the present disclosure, the controller 200 may be configured as an independent chip or may be integrated with the memory device 100. For example, the controller 200 may be implemented on a mainboard. In addition, the controller 200 may be implemented as an integrated memory controller (IMC) included in a microprocessor. In addition, the controller 200 may be disposed in an input/output hub. An input/output hub including the controller 200 may be referred to as a memory controller hub (MCH).

In general, a memory system transmits error information of a memory device to a host, but the host does not transmit a page offline address (or a page retired address) to the memory device. Therefore, the memory device may repeatedly report the same error address in the memory device.

However, in the memory system 10 according to an example embodiment of the present disclosure, the controller 200 may transmit a page offline address POFFL_ADDR to the memory device 100, and the memory device 100 may perform a scrubbing operation according to the page offline address POFFL_ADDR and various scheduling schemes. Thus, a previously page off-lined address may be transmitted to the controller 200 without being duplicated.

When the memory device 100 reports a fail bit and a fail address, the memory system 10 according to an example embodiment of the present disclosure may report an error address after removing a previously reported address or an address retirement-processed by the controller 200. Thus, reliability and applicability of reporting an error address may be increased.

Figure 3:
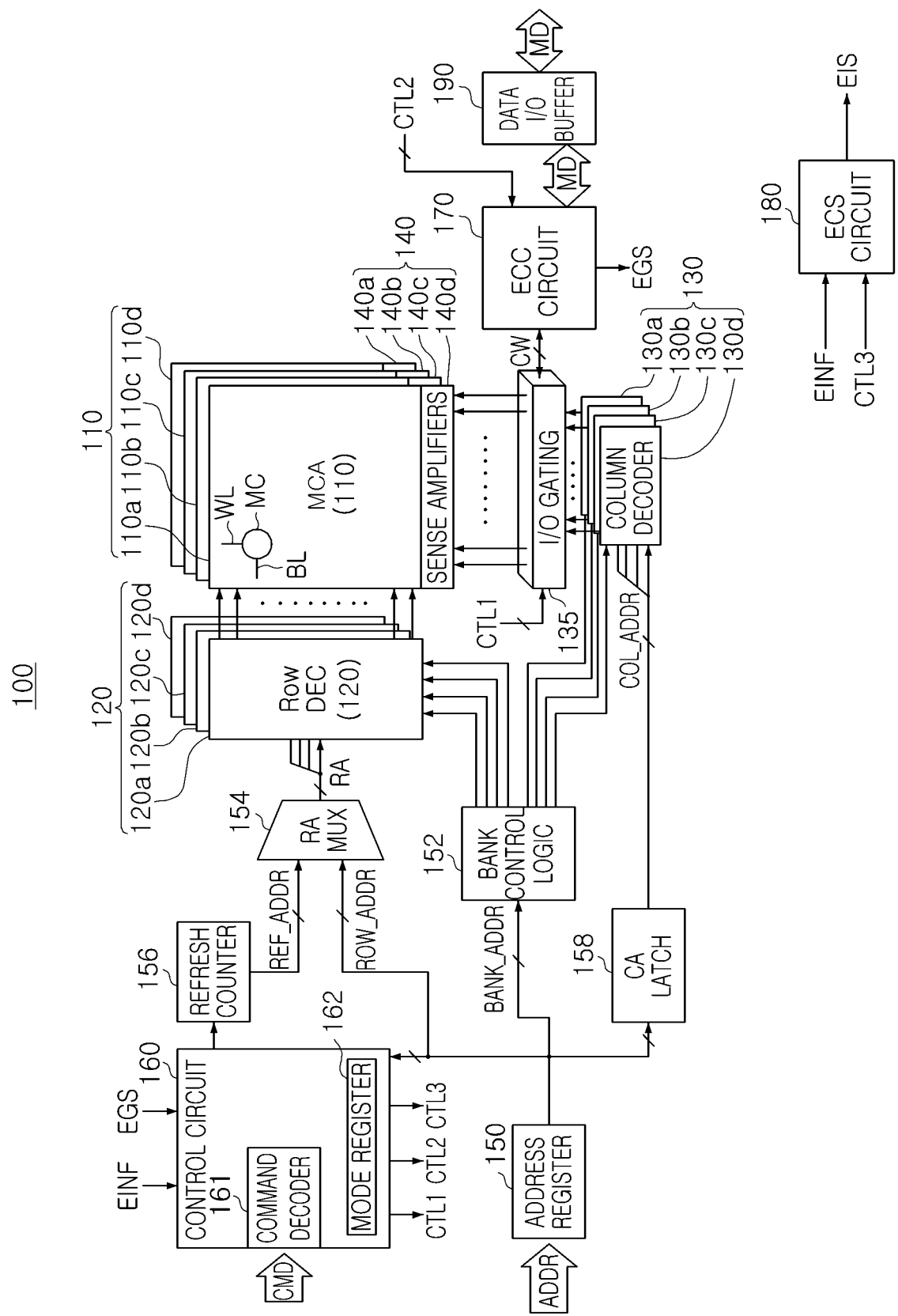
FIG. 3 is a schematic diagram of a memory device according to an example embodiment of the present disclosure.

FIG. 3 is a schematic diagram of a memory device 100 according to an example embodiment of the present disclosure. Referring to FIG. 3, the memory device 100 may include a memory cell array 110, a row decoder 120, a column decoder 130, an input/output (I/O) gating circuit 135, a sense amplifier circuit 140, an address register 150, a bank control logic 152, a row address multiplexer 154, a refresh counter 156, a column address latch 158, a control circuit 160, an error correction circuit 170, an ECS circuit 180, and a data input/output (I/O) buffer 190.

The memory cell array 110 may include first, second, third and fourth bank arrays 110a, 110b, 110c and 110d. Each of the first to fourth bank arrays 110a to 110d may include a plurality of pages including memory cell rows, respectively connected to wordlines WL.

The first to fourth bank arrays 110a to 110d, first, second, third and fourth bank sense amplifiers 140a, 140b, 140c and 140d, first, second, third and fourth bank column decoders 130a, 130b, 130c and 130d, and first, second, third and fourth bank row decoders 160a, 160b, 160c and 160d may constitute first, second, third and fourth banks, respectively. Each of the first to fourth bank arrays 110a to 110d may include a plurality of memory cells MC formed at intersections of a plurality of wordlines WL and a plurality of bitlines BL. In FIG. 3, a memory device 100 is illustrated as including four banks. However, it will be understood that the number of banks of the memory device 100 is not limited thereto. For example, the memory device 100 may include more than four banks.

The row decoder 120 may include first, second, third and fourth bank row decoders 120a, 120b, 120c and 120d, respectively connected to the first to fourth bank arrays 110a to 110d.

The column decoder 130 may include the first to fourth bank column decoders 130a to 130d, respectively connected to the first to fourth bank arrays 110a to 110d.

The sense amplifier circuit 140 may include the first to fourth bank sense amplifiers 140a to 140d, respectively connected to the first to fourth bank arrays 110a to 110d.

The address register 150 may receive an address ADDR, including a bank address BANK_ADDR, a row address ROW_ADDR, and a column address COL_ADDR, from the controller 200 (see FIG. 2). The address register 150 may provide the received bank address BANK_ADDR to the bank control logic 152, may provide the received row address ROW_ADDR to the row address multiplexer 154, and may provide the received column address COL_ADDR to the column address latch 158.

The bank control logic 152 may generate bank control signals in response to the bank address BANK_ADDR. In response to the bank control signals, a bank row decoder corresponding to the bank address BANK_ADDR, among the first to fourth bank row decoders 120a to 120d, may be enabled and a bank column decoder corresponding to the bank address BANK_ADDR, among the first to fourth bank column decoder 130a to 130d, may be enabled. In other words, a bank row decoder corresponding to a first bank address and a bank column decoder corresponding to the first bank address may be enabled.

The refresh counter 156 may generate a refresh row address REF_ADDR for refreshing memory cell rows included in the memory cell array 110 under the control of the control circuit 160. In addition, the refresh counter 156 may not be included in the memory device 100. For example, when the memory cell array 110 is implemented with a plurality of resistive memory cells, the refresh counter 156 may not be included in the semiconductor memory device 100. The refresh counter 156 may be included in the memory device 100 when the memory cells MC of the memory cell array 110 include dynamic memory cells, e.g., DRAM cells.

The row address multiplexer 154 may receive a row address ROW_ADDR from the address register 150, and may receive a refresh row address REF_ADDR from the refresh counter 156. The row address multiplexer 154 may selectively output a row address ROW_ADDR or a refresh row address REF_ADDR as a row address RA to the row decoder 120. The row address RA, output from the row address multiplexer 145, may be applied to each of the first to fourth bank row decoders 120a to 120d.

Among the first to fourth bank row decoders 120a to 120d, a bank row decoder enabled by the bank control logic 152 may decode the row address RA, output from the row address multiplexer 154, to enable a wordline WL corresponding to the row address RA. For example, the enabled bank row decoder may apply a wordline driving voltage to a wordline corresponding to a row address.

The column address latch 158 may receive the column address COL_ADDR from the address register 150, and may temporarily store the received column address COL_ADDR. In addition, the column address latch 158 may gradually increase the received column address COL_ADDR in a burst mode. The column address latch 158 may apply the temporarily stored or gradually increased column address COL_ADDR to each of the first to fourth bank column decoders 130a to 130d.

The I/O gating circuit 135, together with circuits for gating I/O data, may include an input data mask logic, read data latches for storing data output from the first to fourth bank arrays 110a to 110d, and first, second, third and fourth write drivers for writing data to the first to fourth bank arrays 110a to 110d. Among the first to fourth bank column decoders 130a to 130d, a bank column decoder enabled by the bank control logic 152 may enable a sense amplifier corresponding to the bank address BANK_ADDR and the column address COL_ADDR through the I/O gating circuit 135.

When data of a first unit includes an error, the control circuit 160 may correct the error and may control the error correction circuit 170 such that a scrubbing operation is performed to rewrite the corrected data of the first unit to a corresponding subpage. The control circuit 160 may perform an error logging operation in which an error generation signal EGS is counted to write error information EINF, including at least the number of times of an error occurrence for each of some pages, to the ECS circuit 180.

The control circuit 160 may control an operation of the memory device 100. For example, the control circuit 160 may generate control signals such that the memory device 100 performs a write operation or a read operation. The control circuit 160 may include a command decoder 161, decoding a command CMD received from the controller 200, and a mode register 162 for setting an operation mode of the memory device 100.

The control circuit 160 may further include a counter for counting the error generation signal EGS from the error correction circuit 170. For example, the command decoder 161 may decode a write enable signal /WE, a row address strobe signal /RAS, a column address strobe signal /CAS, a chip select signal /CS, and the like, to generate control signals corresponding to a command CMD. For example, the control circuit 160 may decode the command CMD to generate a first control signal CTL1 for controlling the I/O gating circuit 135, a second control signal CTL2 for controlling the error correction circuit 170, and a third control signal CTL3 for controlling the ECS circuit 180.

When the command CMD indicates the ECS mode, the control circuit 160 may generate the first control signal CTL1, the second control signal CTL2, and the third control signal CTL3 such that the I/O gating circuit 135 and the error correction circuit 170 perform the above-described scrubbing operation and the above-described error logging operation.

When a situation in which the number of error occurrences in one page, among some pages, reaches a threshold value (e.g., "a first situation") occurs in an ECS mode, the control signal 160 may notify the controller 200 of the first situation using an alert signal ALRT. In other words, when the first situation occurs in the ECS mode, the controller 200 is notified via an alert signal ALRT.

The error correction circuit 170 may generate parity data based on main data MD provided from the data I/O buffer 190 in a write operation and may provide a codeword CW including the main data MD and the parity data to the I/O gating circuit 135, and the I/O gating circuit 135 may write the codeword CW to a bank array of the first to fourth bank arrays 110a to 110d.

In addition, the error correction circuit 170 may receive a codeword CW, read from a single bank array of the first to fourth bank arrays 110a to 110d, from the I/O gating circuit 135 in a read operation. The error correction circuit 170 may perform decoding on the main data MD to correct the single-bit error, included in the main data MD, to provide the parity data included in the read codeword CW to the data I/O buffer 190.

In addition, the error correction circuit 170 may read data of the first unit, including main data and parity data, from each of a plurality of sub-pages constituting each of some pages of the memory cell array 110 in the ECS mode, and may sequentially perform ECC decoding. The error correction circuit 170 may provide an error generation signal EGS to the control circuit 160 when the data of the first unit includes an error after performing ECC decoding on the data of the first unit.

The data I/O buffer 190 may provide the main data MD, provided from the controller 200, to the error correction circuit 170 in a write operation and may provide the main data MD, provided from the error correction circuit 170, to controller 200 in a read operation. Data to be read in one of the first to fourth bank arrays 110a to 110d may be sensed by a sense amplifier corresponding to the one bank array of the first to fourth bank arrays 110a to 110d, and may be stored in the read data latches. Main data MD to be written to one of the first to fourth bank arrays 110a to 110d may be provided from the controller 200 to the data I/O buffer 190. The main data MD, provided to the data I/O buffer 190, may be encoded as a codeword CW in the error correction circuit 170 and then provided to the I/O gating circuit 135. The codeword CW may be written to the one bank array of the first to fourth bank arrays 110a to 110d through write drivers in the I/O gating circuit 135.

Figure 4A:
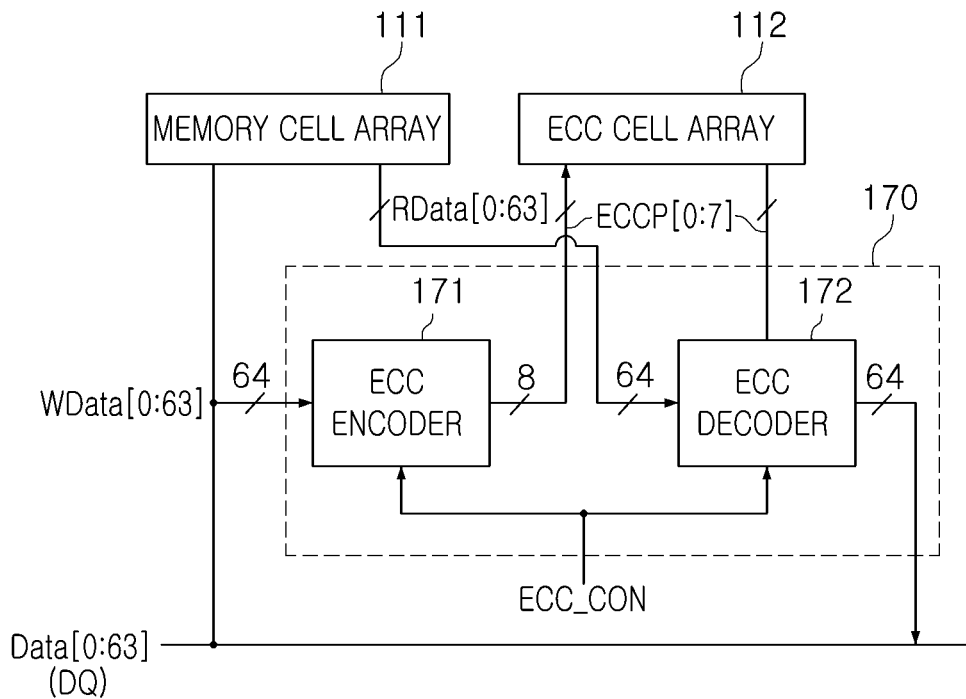
FIGS. 4A, 4B, and 4C are diagrams illustrating an error correction circuit of a memory device according to an example embodiment of the present disclosure.
Figure 4B:
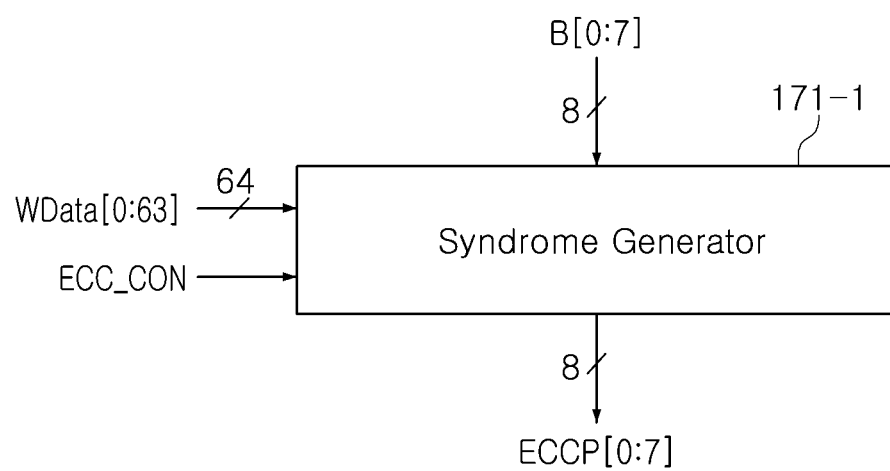
Figure 4C:
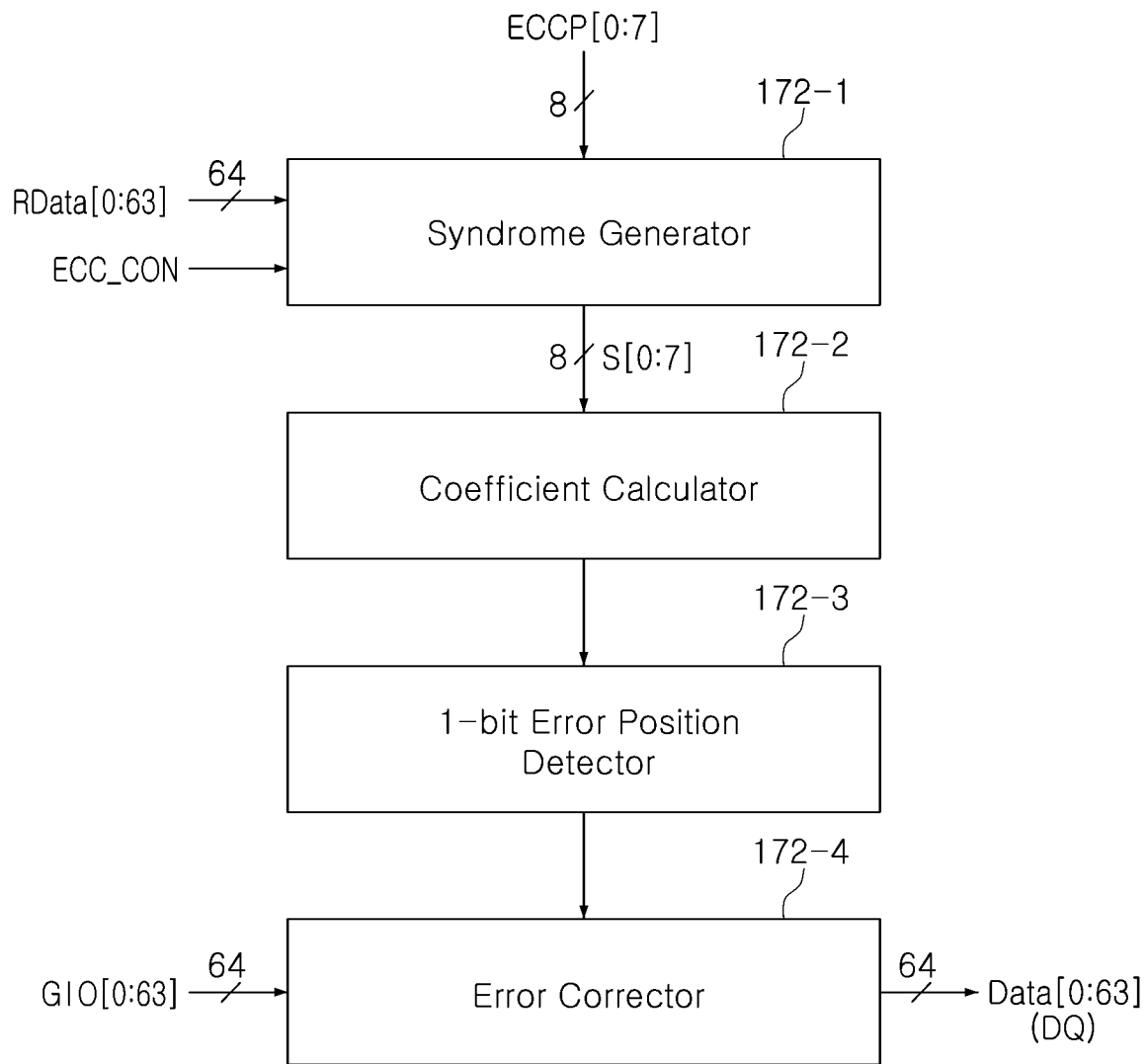

FIGS. 4A, 4B, and 4C are diagrams illustrating the error correction circuit 170 of the memory device 100 according to an example embodiment of the present disclosure.

Referring to FIG. 4A, the error correction circuit 170 may include an ECC encoding circuit 171 and an ECC decoding circuit 172. The ECC encoding circuit 171 may generate parity bits ECCP[0:7] for data WData[0:63] to be written to the memory cells of the memory cell array 110 in response to an ECC control signal ECC_CON. The parity bits ECCP [0:7] may be stored in an ECC cell array 112. In an embodiment of the present disclosure, the ECC encoding circuit 171 may generate parity bits ECCP[0:7] for data WData[0:63] to be written to memory cells including a defective cell, in response to the ECC control signal ECC_CON.

The ECC decoding circuit 172 may correct error bit data using data RData[0:63], read from the memory cells of the memory cell array 110, and parity bits ECCP[0:7], read from the ECC cell array 112, in response to the ECC control signal ECC_CON and may output error-corrected data Data[0:63]. In an embodiment of the present disclosure, the ECC decoding circuit 172 may correct error bit data using data RData [0:63], read from memory cells including defective cells, and parity bits ECCP[0:7], read from the ECC cell array 112, in response to the ECC control signal ECC_CON and may output error-corrected data Data[0:63].

Referring to FIG. 4B, the ECC encoding circuit 171 may receive 64-bit write data WData[0:63] and a basis bit B[0:7] in response to the ECC control signal ECC_CON, and may include a syndrome generator 171-1 for generating parity bits ECCP[0:7], for example, a syndrome, using an XOR array operation. The basis bit B[0:7] may be bits for generating parity bits (ECCP[0:7]) for the 64-bit write data WData[0:63] and may include, for example, b'00000000 bits. The basis bit B[0:7] may use other bits, instead of the b'00000000 bits.

Referring to FIG. 4C, the ECC decoding circuit 172 may include a syndrome generator 172-1, a coefficient calculator 172-2, a 1-bit error position detector 172-3, and an error corrector 172-4. The syndrome generator 172-1 may receive 64-bit read data RData [0:63] and 8 bits of parity bits ECCP[0:7] in response to the ECC control signal ECC_CON, and may generate syndrome data S[0:7] using an XOR array operation. The coefficient calculator 172-2 may calculate a coefficient of an error position equation using the syndrome data S[0:7]. The error position equation is an equation in which a reciprocal of an error bit is a value. The 1-bit error position detector 172-3 may calculate a position of a 1-bit error using the calculated error position equation. The error corrector 172-4 may determine a 1-bit error position based on a detection result of the 1-bit error position detector 172-3. The error corrector 172-4 may inverse a logic value of an error-generated bit, among the 64-bit read data RData[0:63], based on the determined 1-bit error position information to correct an error and may output error-corrected 64-bit data Data[0:63] (DQ).

FIGS. 5A to 5E are diagrams illustrating examples of the ECS circuit 180 according to an example embodiment of the present disclosure.

Figure 5A:
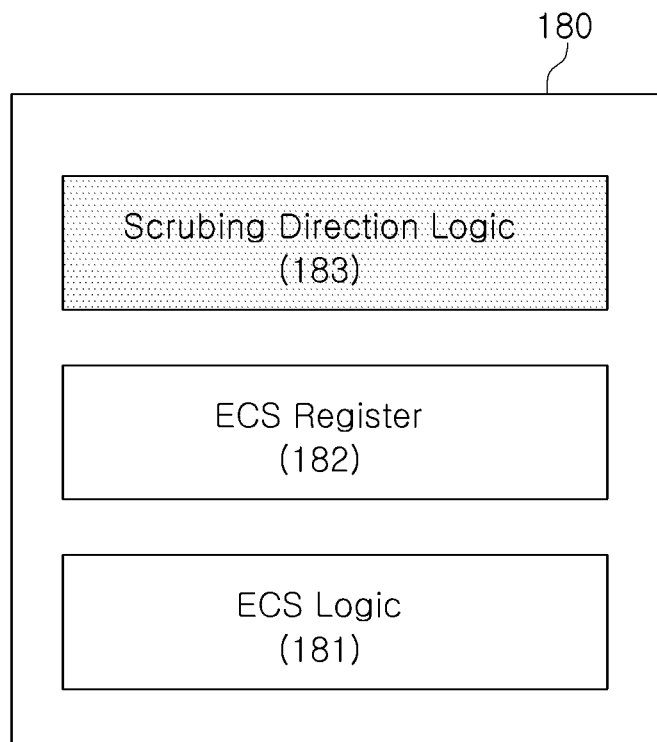
FIGS. 5A, 5B, 5C, 5D and 5E are diagrams illustrating examples of an error check and scrub (ECS) circuit according to an example embodiment of the present disclosure.

Referring to FIG. 5A, the ECS circuit 180 may include an ECS logic 181 for performing a scrubbing operation, an ECS register 182 for storing an error address based on a result of the scrubbing operation, and a scrubbing direction logic 183 for determining a direction of the scrubbing operation.

The ECS logic 181 may be enabled in an ECS mode, and may read data from the memory cell array (MCA) 110 corresponding to a received address, correct an error in the read data through the ECC circuit 170, rewrite the error-corrected data to a corresponding address in the memory cell array 110, and repeat the above operations while counting up or counting down the received address by a predetermined unit. The scrubbing direction logic 183 may determine whether to perform a scrubbing operation of the memory cell array 110 in a forward direction or in a reverse direction. For example, the forward direction is a direction in which an address is increased (for example, an address count-up direction), and the reverse direction may be a direction in which an address is decreased (for example, an address count-down direction).

Figure 5B:
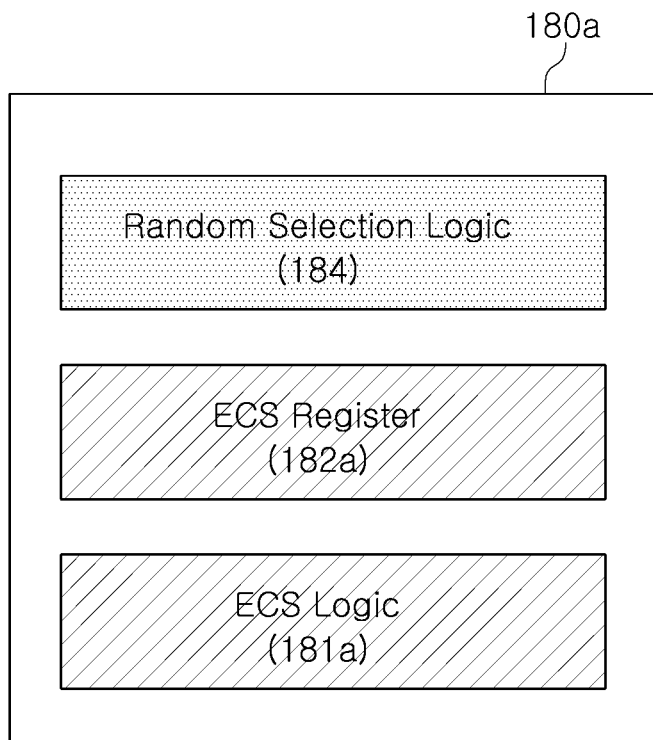

Referring to FIG. 5B, the ECS circuit 180a may include an ECS logic 181a, an ECS register 182a, and a random select logic 184. The ECS logic 181a may randomly select an error address, among a plurality of error addresses detected in the scrubbing operation, and may output the selected error address to the controller 200 (see FIG. 2). The ECS register 182a may store the plurality of error addresses according to the scrubbing operation. The random select logic 184 may be configured to select one of the plurality of error addresses stored in the ECS register 182a. The random select logic 184 may include a random number generator or a pseudo random number generator.

Figure 5C:
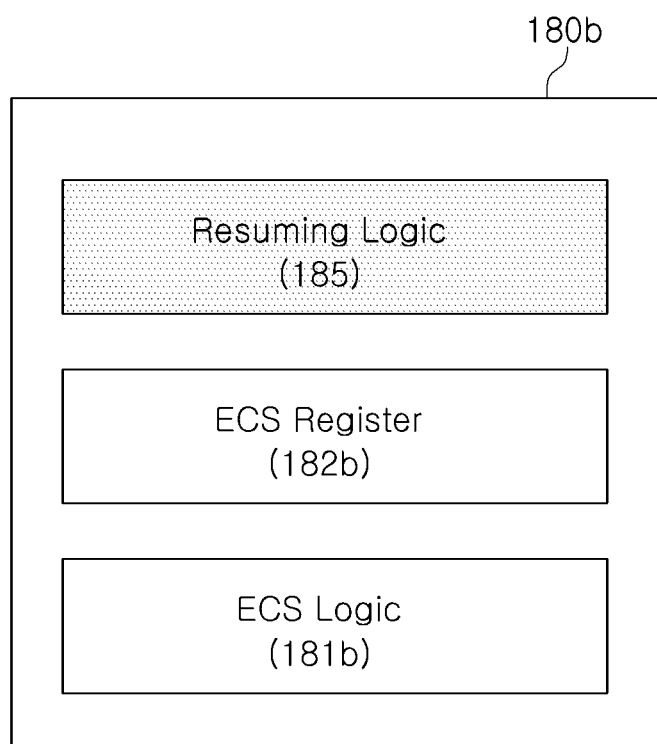

Referring to FIG. 5C, an ECS circuit 180B may include an ECS logic 181b, an ECS register 182b, and a resuming logic 185. The ECS logic 181b may stop a scrubbing operation when an error occurs, and may then resume the scrubbing operation after reporting an error address to the controller 200. The ECS register 182b may store a real-time error address according to the scrubbing operation. The resuming logic 185 may be configured to store an address, at which the scrubbing operation is stopped, and to transmit an address, at which the scrubbing operation is to be resumed, to the ECS logic 181b. The ECS logic 181b may complete or resume the scrubbing operation according to the control of the resuming logic 185.

The ECS circuit may be implemented in a combination of the scrubbing direction logic, the random select logic, and the resuming logic described above.

Figure 5D:
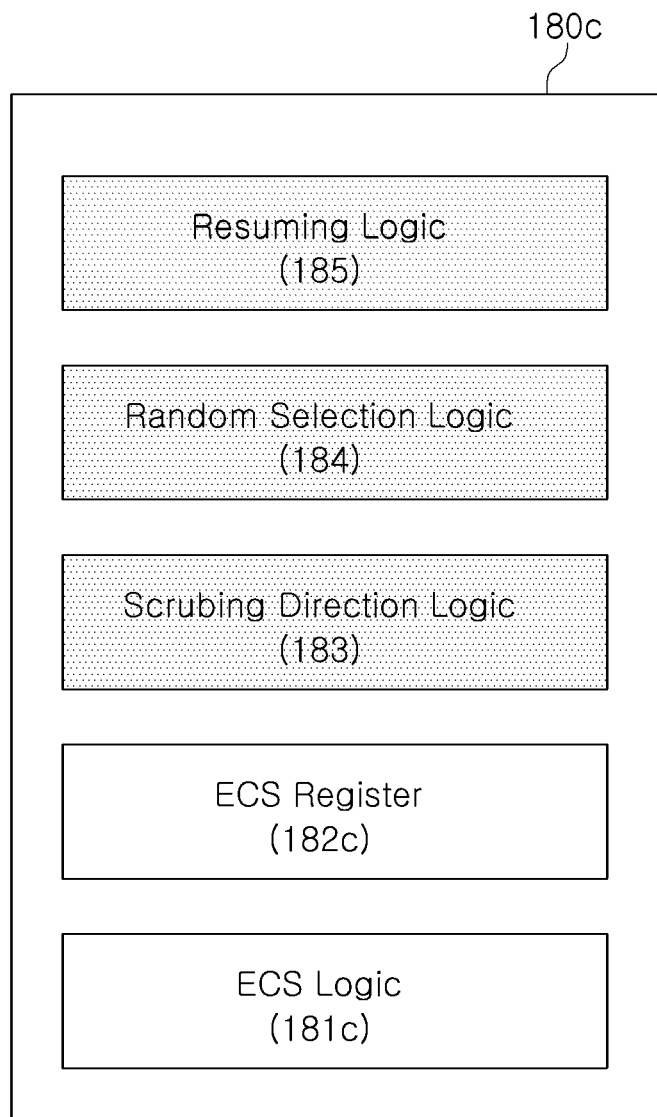

Referring to FIG. 5D, an ECS circuit 180c may include an ECS logic 181c, an ECS register 182c, a scrubbing direction logic 183, a random selection logic 184, and a resuming logic 185. In the ECS circuit 180*c*, the scrubbing direction logic 183 may determine a direction of a scrubbing operation, the random select logic 184 may report one of detected error addresses, and the resuming logic 185 may resume the scrubbing operation after the reporting.

Figure 5E:
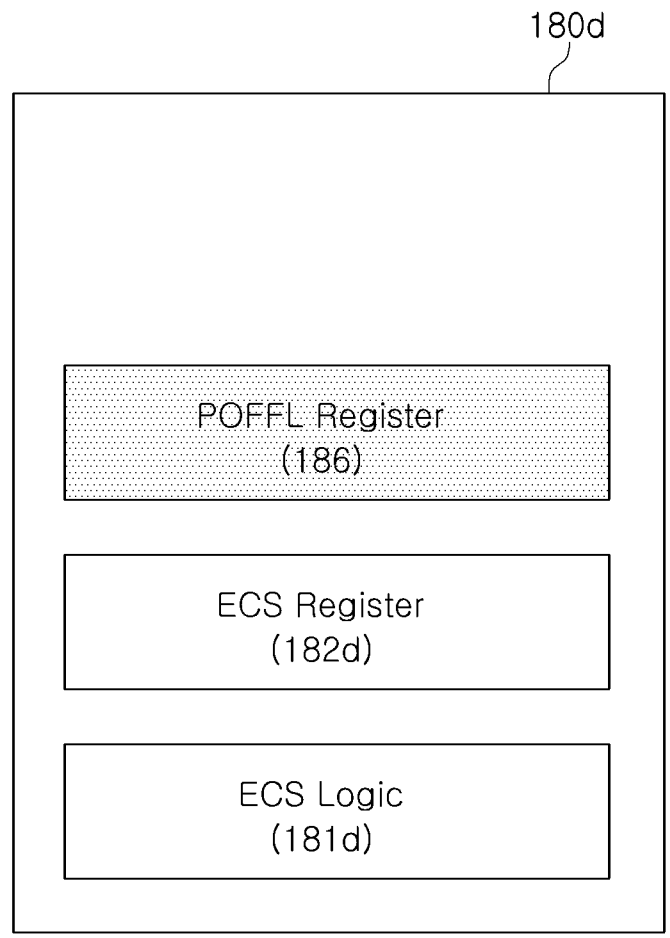

Referring to FIG. 5E, an ECS circuit 180*d* may include an ECS logic 181*d*, an ECS register (e.g., a first register) 182*d*, and a POFFL register (e.g., a second register) 186. In other words, the ECS circuit 180*d* may include first and second registers. The POFFL register 186 may store a mapped-out page offline address POFFL_ADDR received from the controller 200. The ECS logic 181*d* may perform a scrubbing operation to compare a detected error address with the page offline address POFFL_ADDR stored in the POFFL register 186 and may store only error addresses, which are not identical to each other as a result of the comparison, in the ECS register 182*d*. For example, the ECS register 182*d* may remove a mapped-out address from the controller 200 to store an error address. In an embodiment of the present disclosure, a size of the POFFL register 186 may be larger than a size of the ECS register 182*d*.

The ECS logic may be implemented by various combinations of a POFFL register, a scrubbing direction logic, a random select logic, and a resuming logic.

Figure 6:
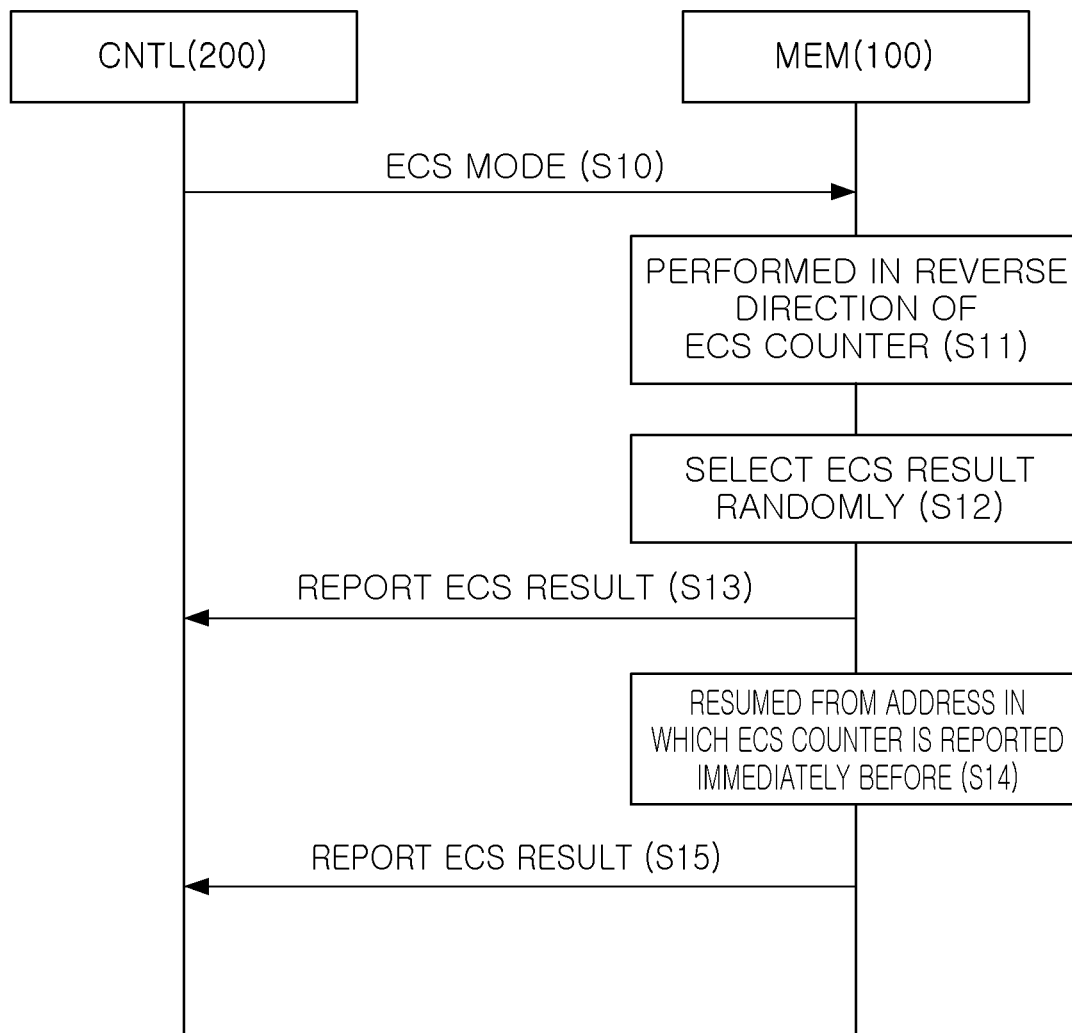
FIG. 6 is a ladder diagram illustrating an ECS operation of a memory system according to an example embodiment of the present disclosure.

FIG. 6 is a ladder diagram illustrating an ECS operation of a memory system 10 according to an example embodiment of the present disclosure.

Referring to FIGS. 2 to 6, the ECS operation may be performed, as follows. The controller (CNTL) 200 may transmit ECS mode information and an address to the memory device MEM 100 (see FIG. 2) (S10). The memory device MEM 100 may enable the ECS circuit 180 in response to an ECS mode. The ECS circuit 180 may perform a scrubbing operation from the received address. In this case, the scrubbing operation may be performed in a reverse direction of the ECS counter. For example, the scrubbing operation may be performed while counting down the address (S11). A plurality of error addresses according to the scrubbing operation may be stored. The ECS circuit 180 may randomly select one of the stored error addresses (S12). The selected error address may be reported as an ECS result according to a request of the controller 200 (S130). After reporting such error information, the ECS circuit 180 may resume the scrubbing operation from an address at which the ECS counter was reported immediately before (S14). For example, the address prior to the reported selected error address may be the start point of the resumed scrubbing operation. Then, the detected error address may be reported as an ECS result according to a request of the controller 200 (S15).

Figure 7A:
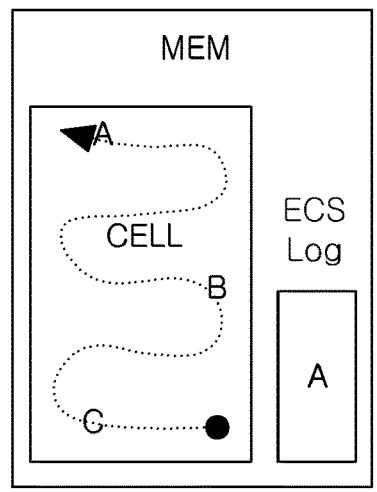
FIGS. 7A, 7B, and 7C are diagrams illustrating scheduling of a scrubbing operation in a memory device according to an example embodiment of the present disclosure.
Figure 7B:
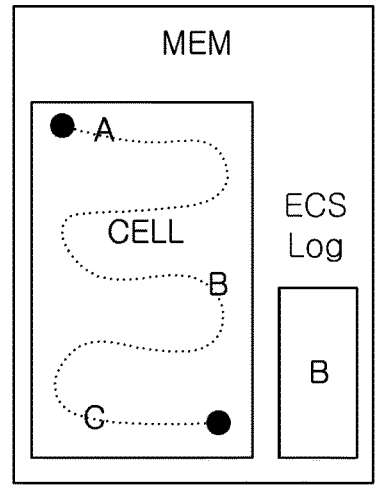
Figure 7C:
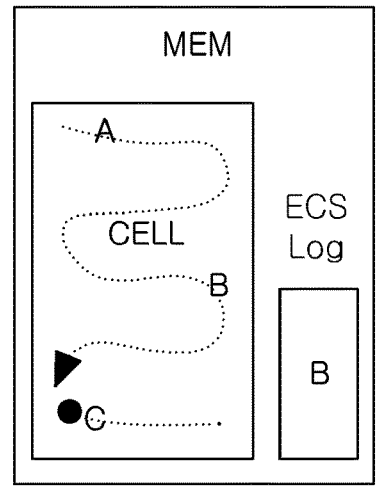

FIGS. 7A, 7B, and 7C are diagrams illustrating scheduling of a scrubbing operation in a memory device MEM according to an example embodiment of the present disclosure.

Referring to FIG. 7A, a scrubbing operation may be performed in a reverse direction, and a final error address A may be stored in an ECS register. Referring to FIG. 7B, a scrubbing operation may be performed in a forward direction, and a randomly selected address B, among a plurality of error addresses A, B, and C, may be stored in the ECS register. Referring to FIG. 7C, a scrubbing operation may be performed in a forward direction or may be stopped until an error address B is reported after the error address B is detected, and then may be resumed.

Figure 8:
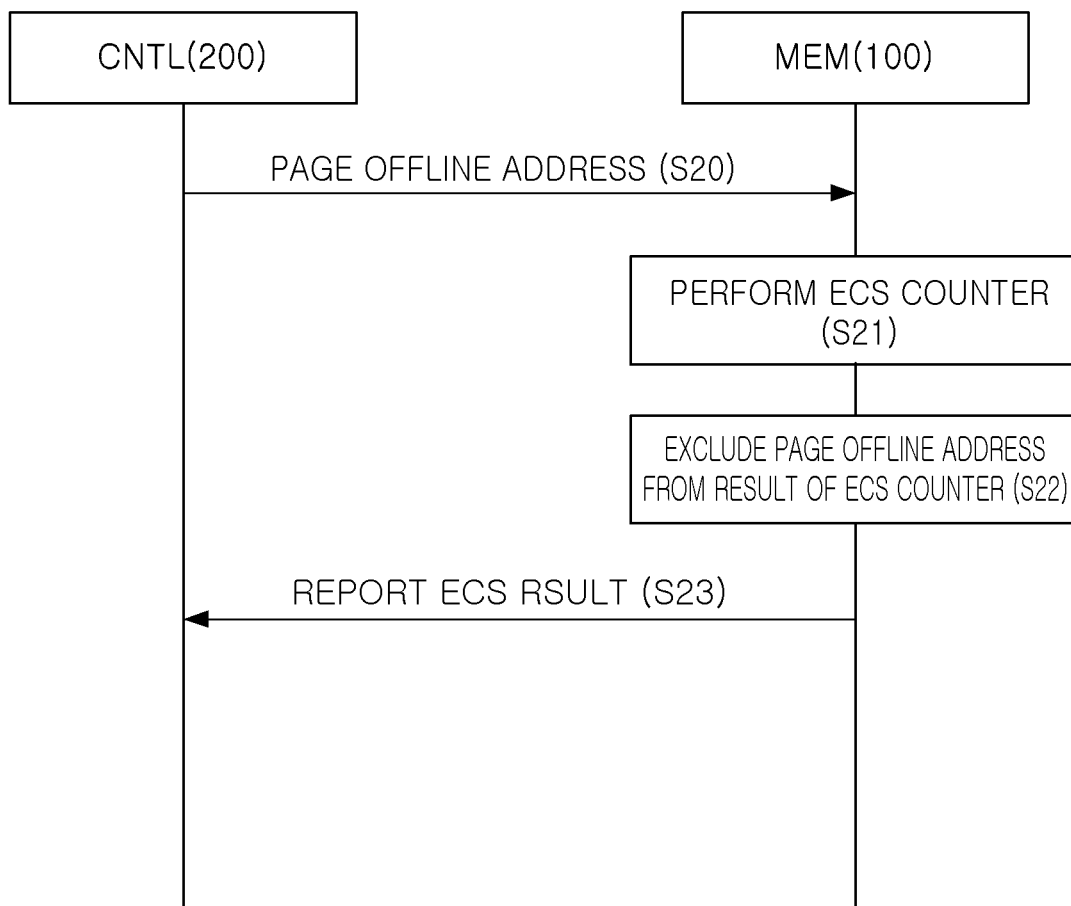
FIG. 8 is a ladder diagram illustrating an ECS operation of a memory system according to an example embodiment of the present disclosure.

FIG. 8 is a ladder diagram illustrating an ECS operation of a memory system 10 according to an example embodiment of the present disclosure.

Referring to FIGS. 2 to 8, the ECS operation may be performed, as follows. The controller CNTL 200 may transmit a mapped-out address, for example, a page offline address POFFL_ADDR, to the memory device (MEM) 100 (S20). The ECS circuit 180 of the memory device 100 may store the received page offline address POFFL_ADDR. The ECS circuit 180 may perform a scrubbing operation while counting up or counting down (S21). The ECS circuit 180 may store detected error addresses in the ECS register after excluding the page offline address POFFL_ADDR from the detected error addresses (S22). In response to a request of the controller 200, the memory device 100 may report an ECS result stored in the ECS register, for example, an error address, to the controller 200 (S23).

Figure 9:
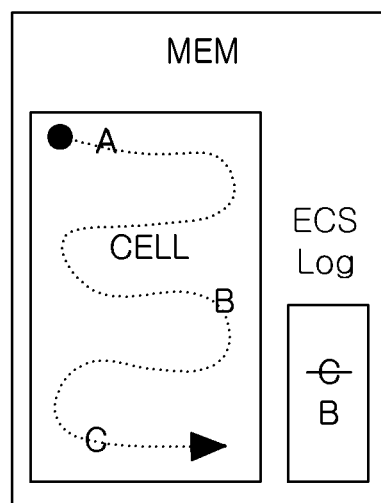
FIG. 9 is a diagram illustrating scheduling of a scrubbing operation in a memory device according to another example embodiment of the present disclosure.

FIG. 9 is al diagram illustrating scheduling of a scrubbing operation in a memory device MEM according to another example embodiment of the present disclosure. Referring to FIG. 9, since an address C is detected in the scrubbing operation but is a page offline address, the address C may be excluded from an error address and a detected address B may be stored as an error address, instead of the address C. The stored error address B may be reported in response to a request of a controller 200.

The memory device according to an example embodiment of the present disclosure may set a range of the scrubbing operation using the page offline address.

Figure 10:
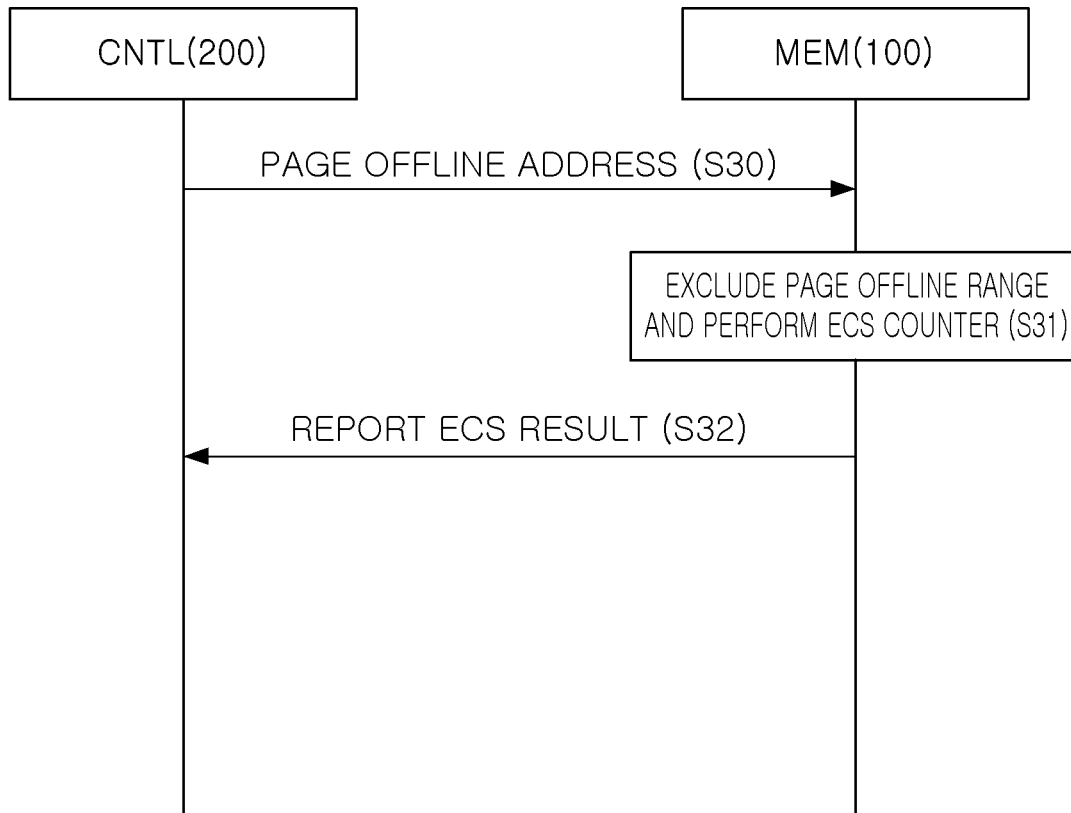
FIG. 10 is a ladder diagram illustrating an ECS operation of a memory system according to another example embodiment of the present disclosure.

FIG. 10 is a ladder diagram illustrating an ECS operation of a memory system according to another example embodiment of the present disclosure. Referring to FIGS. 2 to 10, the ECS operation may be performed, as follows.

The controller (CNTL) 200 may transmit a page offline address POFFL_ADDR (see FIG. 2) to the memory device (MEM) 100 (S30). The ECS circuit 180 of the memory device 100 may store the page offline address POFFL_ADDR. The ECS circuit 180 may perform a scrubbing operation after excluding a range corresponding to the page offline address POFFL_ADDR (S31). In response to a request of the controller 200, the memory device 100 may report an ECS result stored in the ECS register, for example, an error address, to the controller 200 (S32).

Figure 11:
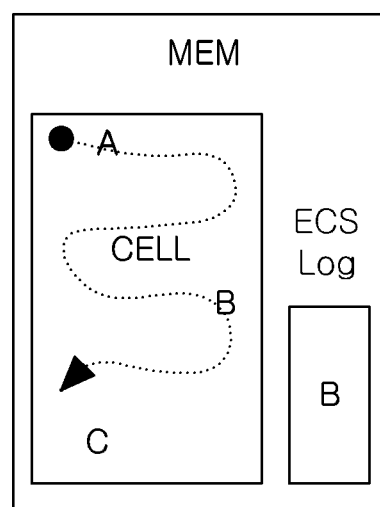
FIG. 11 is a diagram illustrating scheduling of a scrubbing operation in a memory device according to another example embodiment of the present disclosure.

FIG. 11 is a diagram illustrating scheduling of a scrubbing operation in a memory device according to another example embodiment of the present disclosure.

Referring to FIGS. 10 and 11, when the page offline address POFFL_ADDR is an address C, a scrubbing operation may be performed after excluding a range corresponding to the address C. Accordingly, an address to be finally stored in the error register is B, as illustrated in FIG. 11.

Figure 12:
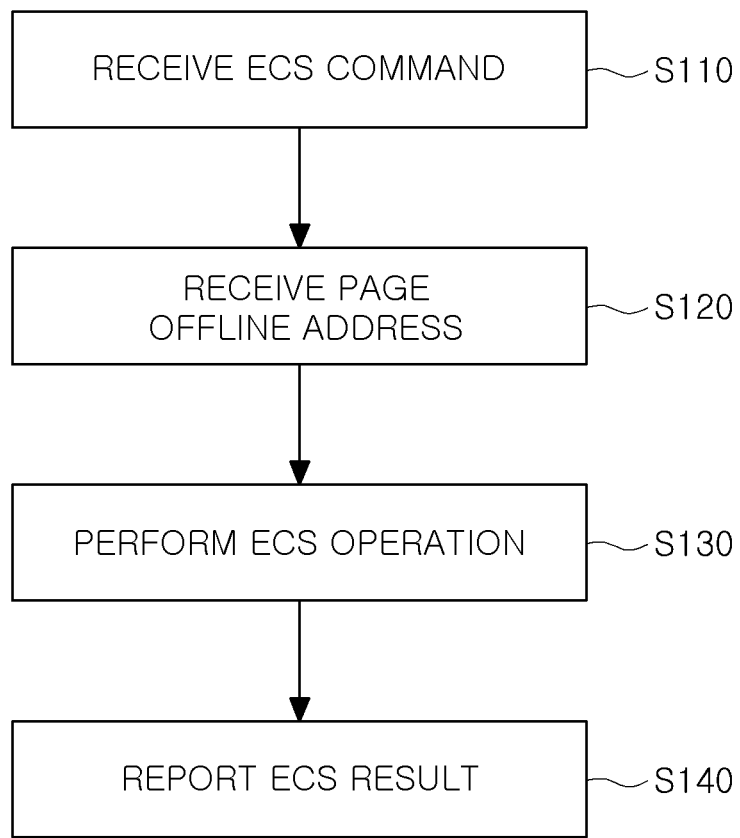
FIG. 12 is a flowchart illustrating an operating method of a memory device according to an example embodiment of the present disclosure.

FIG. 12 is a flowchart illustrating an operating method of a memory device according to an example embodiment of the present disclosure. Referring to FIG. 2 to 12, the memory device 100 may operate, as follows.

The memory device 100 may receive an ECS command from the controller 200 (see FIG. 2) (S110). The memory device 100 may receive a page offline address POFFL_ADDR from the controller 200 (S120). The memory device 100 may perform a scrubbing operation while increasing or decreasing the address counter (S130). In other words, the memory device 100 may perform an ECS operation. In an embodiment of the present disclosure, an error address according to a scrubbing operation may be stored. In another embodiment of the present disclosure, an error address according to the scrubbing operation may be stored except for the page offline address POFFL_ADDR. The memory device 100 may report stored error address to the controller 200 after excluding a page offline address from the stored error addresses, or may randomly select and report one of the stored error addresses (S140). In other words, the memory device 100 may report the result of the ECS operation.

Figure 13:
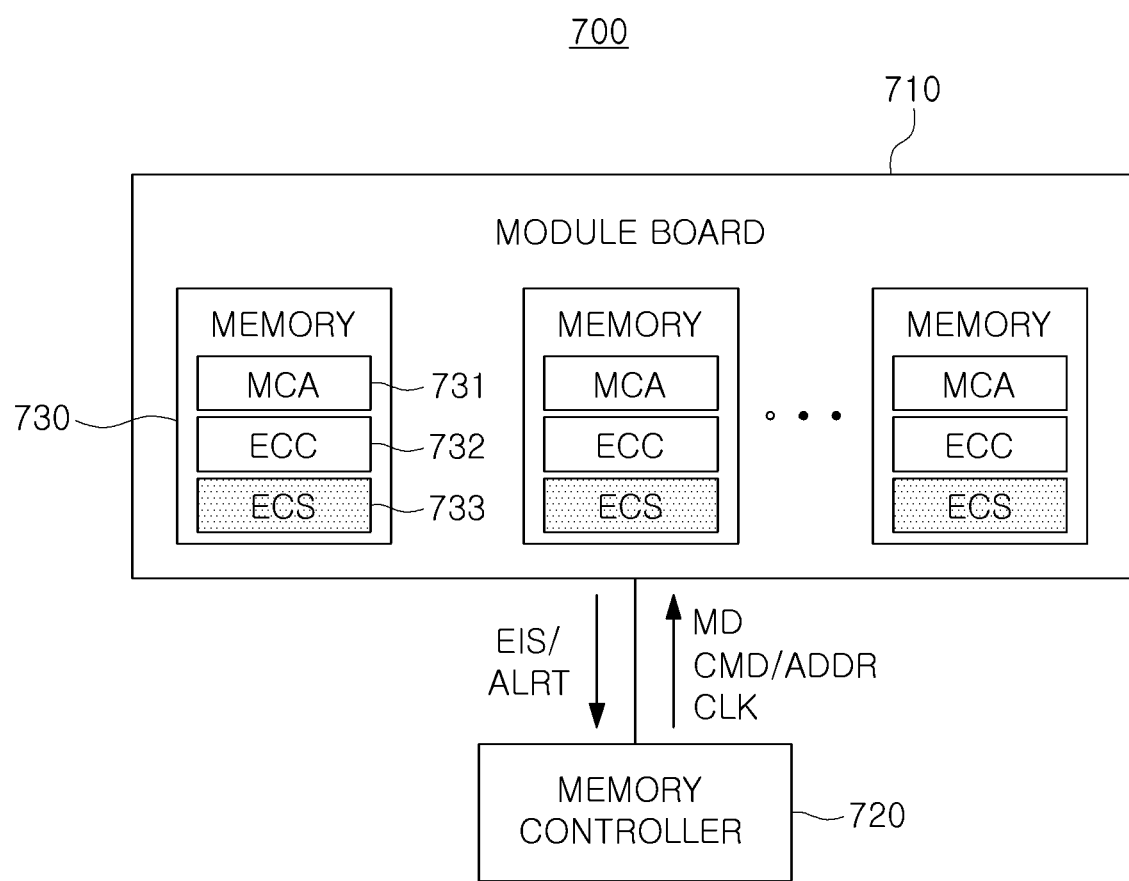
FIG. 13 is a block diagram of a memory system to which a semiconductor memory device according to an example embodiment of the present disclosure is applied.

FIG. 13 is a block diagram of a memory system to which a semiconductor memory device according to an example embodiment of the present disclosure is applied. Referring to FIG. 13, a memory system 700 may include a memory module 710 and a memory controller 720. The memory module 710 may include a plurality of semiconductor memory devices 730 mounted on a module board.

Each of the semiconductor memory devices 730 may be implemented with the memory device 100 of FIG. 2. For example, each of the semiconductor memory devices 730 may include a memory cell array 731, an error correction circuit 732, and an error log register 733. Each of the semiconductor memory devices 730 may perform an ECS operation on some pages of the memory cell array 731 in an ECS mode, and may provide error information of some pages to the memory controller 720 as an error information signal EIS. In the case in which the number of errors per one page, among some pages, reaches a threshold value, each of the semiconductor memory devices 730 may notify the memory controller 720 of the case using an alert signal ALRT.

The memory controller 720 may determine an error management scheme of faulty pages, including more errors than other pages in each of the semiconductor memory devices 730, based on the error information signal EIS.

In addition, the memory controller 720 may apply a scrubbing command to a corresponding semiconductor memory device in response to the alert signal ALRT to immediately perform a scrubbing operation on the one page of the corresponding semiconductor memory device.

Each of the semiconductor memory devices 730 may be provided with a three-dimensional (3D) memory array. In the 3D memory array, memory cell arrays having one or more physical levels including an active region disposed on a silicon substrate and circuits associated with an operation of the memory cells may be monolithically formed. The term "monolithically" may mean that each level of an array, including a plurality of layers, is directly stacked on a lower layer.

The memory module 710 may communicate with the memory controller 720 through a system bus. Main data MD, command/address CMD/ADDR, a clock signal CLK, and the like, may be transmitted and received between the memory module 710 and the memory controller 720 through the system bus. In addition, each of the semiconductor memory devices 730 may transmit the error information signal EIS and the alert signal ALRT to the memory controller 720 through the system bus.

Figure 14:
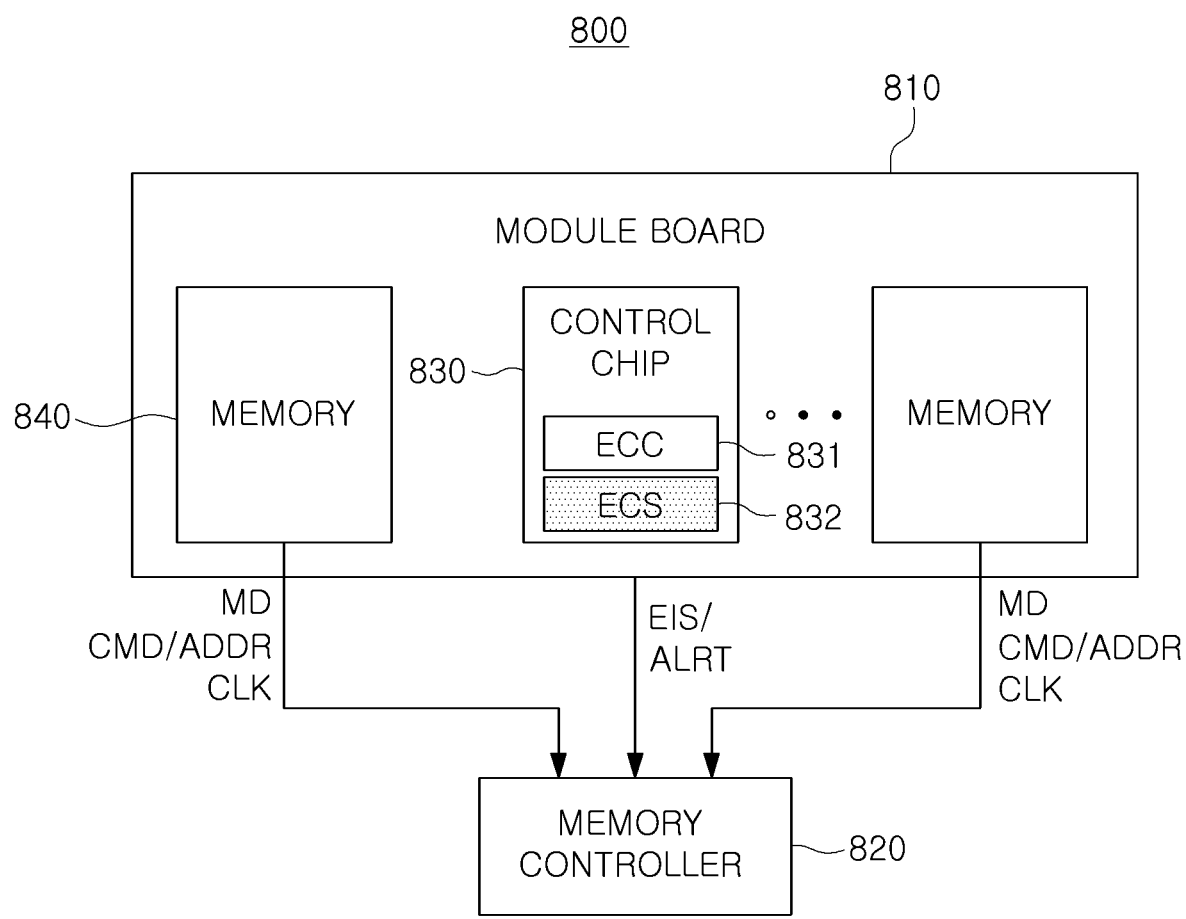
FIG. 14 is a block diagram of a memory system to which a semiconductor memory device according to an example embodiment of the present disclosure is applied.

FIG. 14 is a block diagram of a memory system to which a semiconductor memory device according to an example embodiment of the present disclosure is applied. Referring to FIG. 14, a memory system 800 may include a memory module 810 and a memory controller 820.

The memory module 810 may include memory chips 840 and a control chip 830. Each of the memory chips 840 may store data MD based on a command CMD, an address ADDR, and a clock signal CLK, and may provide the stored data MD to the memory controller 820. Each of the memory chips 840 may be implemented as the memory device 100 of FIG. 2.

The control chip 830 may control the memory chips 840 in response to various signals transmitted from the memory controller 820. For example, the control chip 830 may enable a memory chip corresponding to a chip select signal transmitted from the memory controller 820. In addition, the control chip 830 may include an error correction circuit 831 and an error log register 832. The control chip 830 may perform an ECC decoding operation on data read from each of the memory chips 840. In addition, the control chip 830 may perform the above-described ECS operation on some pages of a selected memory chip, among the memory chips 840, in an ECS mode and may write error information of each of some pages to the error log register 832. In an embodiment of the present disclosure, the error log register 832 may be provided for each of the memory chips 840. In an embodiment of the present disclosure, only one error log register 832 may be provided for the memory chips 840. When only one error log register 832 is provided, the error log register 832 may further include a column, to which memory identification information indicating a selected memory chip is written, in addition to the error log register 460.

The control chip 830 may provide error information of each of the memory chips 840, written to the error log register 832, to the memory controller 820 as an error information signal EIS. In the case in which the number of errors of the selected memory chip reaches a threshold value, the control chip 830 may immediately notify the case using the alert signal ALRT, and the memory controller 820 may immediately apply a scrubbing command to the memory chip in response to the alert signal ALRT.

The memory controller 820 may determine an error management scheme of the memory chips 840 based on the error information signal EIS. For example, the memory controller 820 may kill a memory chip ("chip-kill") when an error of one of the memory chips 840 is unmanageably increased.

Figure 15:
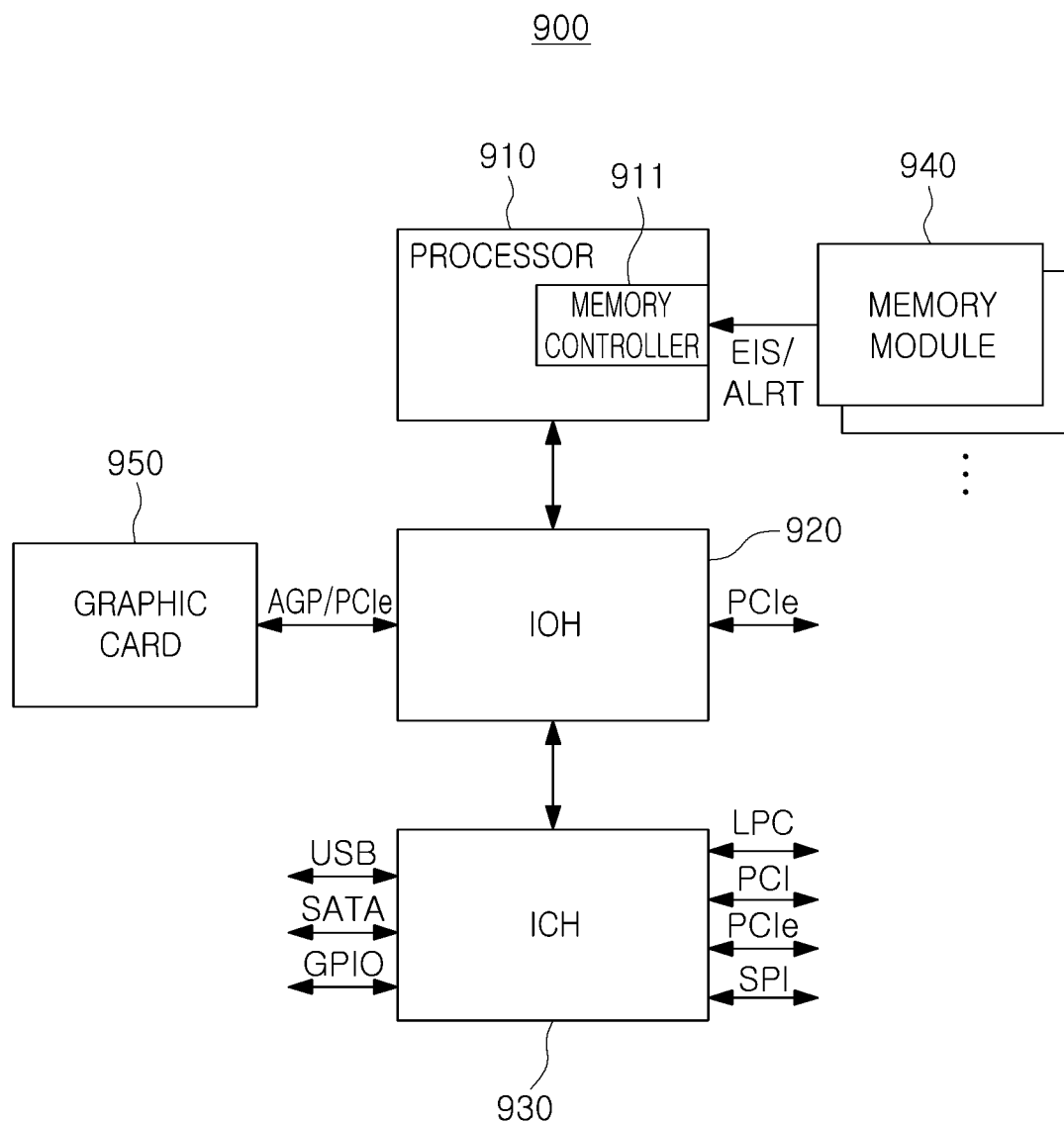
FIG. 15 is a block diagram illustrating applying a semiconductor memory device according to an example embodiment of the present disclosure to a computing system.

FIG. 15 is a block diagram illustrating an example of applying a semiconductor memory device according to an example embodiment of the present disclosure to a computing system. Referring to FIG. 15, a computing system 900 may include a processor 910, an input/output (I/O) hub 920, an input/output (I/O) controller hub 930, at least one memory module 940, and a graphics card 950. According to an embodiment of the present disclosure, the computing system 900 may be any computing system such as a personal computer (PC), a server computer, a workstation, a laptop computer, a mobile phone, and a smartphone, a personal digital assistant (PDA), a portable multimedia player (PMP), a digital camera, a digital television, a set-top box, a music player, a portable game console, a navigation system, or the like.

The processor 910 may perform various computing functions, such as specific calculations or tasks. For example, the processor 910 may be a microprocessor or a central processing unit (CPU). According to an embodiment of the present disclosure, the processor 910 may include a single core or multiple cores. For example, the processor 910 may include multiple cores such as dual-cores, quad-cores, hexa-cores, or the like. In FIG. 15, the computing system 900 is illustrated as including a single processor 910. However, according to an embodiment of the present disclosure, the computing system 900 may include a plurality of processors. According to an embodiment of the present disclosure, the processor 910 may further include a cache memory disposed inside or outside the processor 910.

The processor 910 may include a memory controller 911 for controlling an operation of the memory module 940. The memory controller 911, included in the processor 910, may be referred to as an integrated memory controller (IMC). A memory interface between the memory controller 911 and the memory module 940 may be implemented as a single channel including a plurality of signal lines, or may be implemented as a plurality of channels. In addition, one or more memory modules 940 may be connected to each channel. According to an embodiment of the present disclosure, the memory controller 911 may be disposed in the I/O hub 920. The I/O hub 920, including the memory controller 911, may be referred to as a memory controller hub (MCH).

The memory module 940 may include semiconductor memory devices for storing data provided from the memory controller 911. As described with reference to FIGS. 2 to 13, each of the semiconductor memory devices may include a control circuit, an error correction circuit, and an error log register such that the above-described ECS operation and error logging operation are performed to provide an error information signal EIS and an alert signal ALRT to the memory controller 911. The memory controller 911 may determine an error management scheme for the semiconductor memory devices, based on the error information signal EIS.

The I/O hub 920 may provide various interfaces with devices. For example, the I/O hub 920 may provide interfaces such as an accelerated graphics terminal (AGP) interface, a peripheral component interface-express (PCIe), a communications streaming architecture (CSA), and the like.

The graphics card 950 may be connected with the I/O hub 920 through an AGP or a PCIe. The graphics card 950 may control a display device to display an image. The graphics card 950 may include an internal processor and an internal semiconductor memory device to process image data. According to embodiments of the present disclosure, the I/O hub 920 may include a graphics device disposed inside the I/O hub 920, together with the graphics card 950 disposed outside the V/O hub 920 or rather than the graphics card 950. The graphics device, included in the I/O hub 920, may be referred to as integrated graphics. In addition, the I/O hub 920 including the memory controller and the graphic device may be referred to as a graphics and memory controller hub (GMCH).

The I/O controller hub 930 may perform a data buffering operation and an interface arbitration operation to effectively operate various system interfaces. The I/O controller hub 930 may be connected to the I/O hub 920 through an internal bus. For example, the I/O hub 920 and the I/O controller hub 930 may be connected to each other through a direct media interface (DMI), a hub interface, an enterprise south bridge interface (ESI), a PCIe, or the like.

The I/O controller hub 930 may provide various interfaces with peripheral devices. For example, the I/O controller hub 930 may provide a universal serial bus (USB) port, a serial advanced technology attachment (SATA) port, a general purpose input/output (GPIO), a low pin count (LPC) bus, a serial peripheral interface (SPI), a PCI, a PCIe, or the like.

According to an embodiment of the present disclosure, the processor 910, the I/O hub 920, and the I/O controller hub 930 may be implemented as separated chipsets or integrated circuits, respectively. Alternatively, among the processor 910, the I/O hub 920, or the I/O controller hub 930, at least two components may be implemented as a single chipset.

Figure 16:
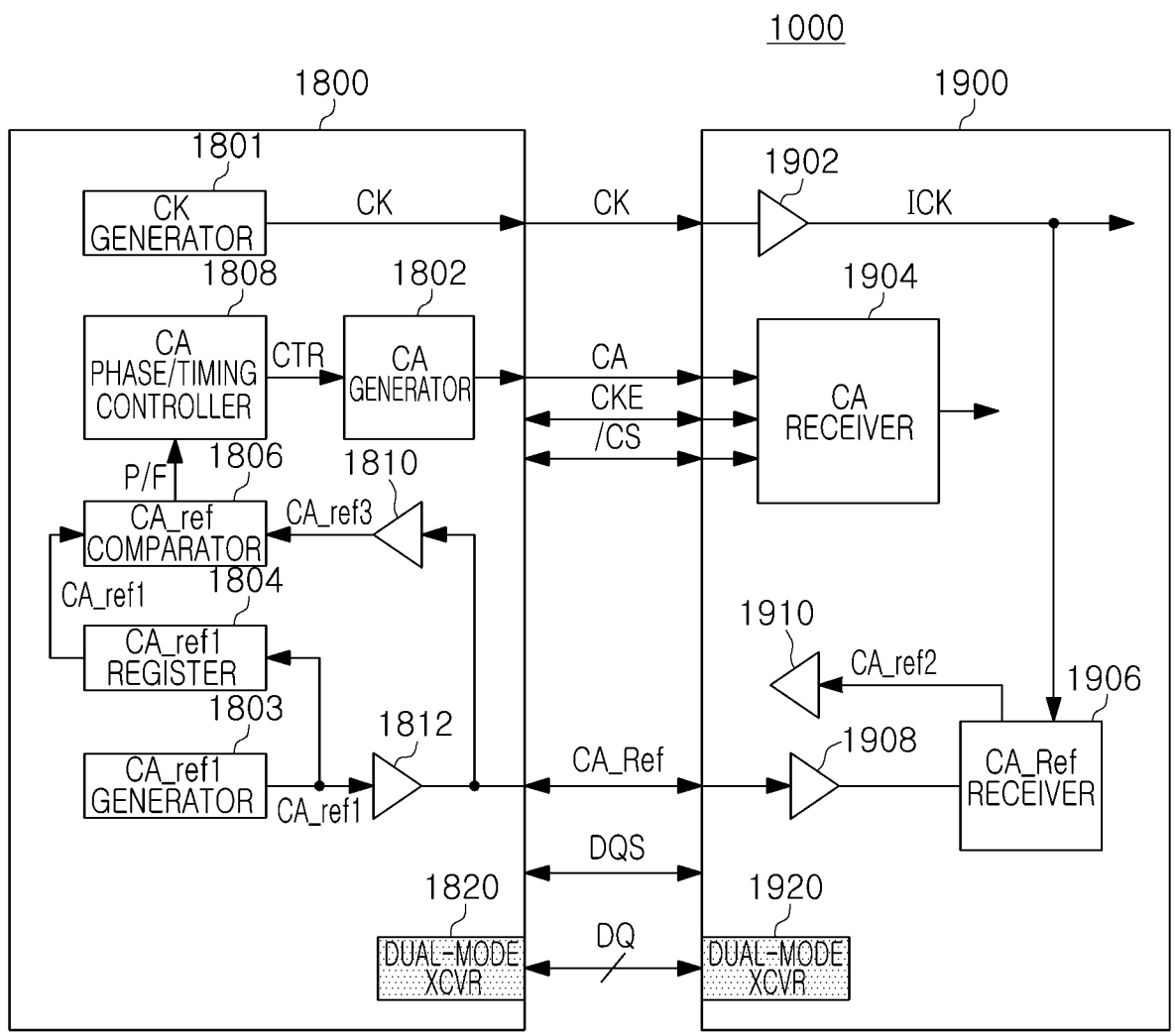
FIG. 16 is a diagram illustrating a memory system performing at least one command/address calibration according to an example embodiment of the present disclosure.

FIG. 16 is a diagram illustrating a memory system for performing at least one command/address calibration according to an example embodiment of the present disclosure. Referring to FIG. 16, the memory system 1000 may include a controller 1800 and a memory device 1900. The controller 1800 may include a clock generator 1801, a command/address (CA) generator 1802, a command/address reference generator 1803, a register 1804, a comparator 1806, a phase/timing controller 1808, and data input/output (I/O) units 1810 and 1812. The controller 1800 may provide a clock signal CK, generated by the clock generator 1801, to the memory device 1900 through a clock signal line.

In example embodiments of the present disclosure, the memory system 1000 may have an additional command/address reference signal (CA_Ref) line provided in an interface. The command/address reference signal (CA_Ref) line may serve to transmit and receive a reference signal CA_Ref of a command/address, a reference value of a command/address, in a calibration mode. A calibration result value using such a reference value of the command/address may be provided to the phase/timing controller 1808 to adjust phase/timing of the command/address signal CA. Since there is the additional command/address reference signal (CA_Ref) line, a calibration operation may be performed to adjust phase/timing of the command/address signal CA while performing an operation to transmit the command/address signal CA.

The CA generator 1802 may generate a phase or timing-adjusted command/address signal CA in response to a control signal CTR of the phase/timing controller 1808, and may transmit the phase or timing-adjusted command/address signal CA to a memory device 1900 through a CA bus.

The command/address reference generator 1803 may have the same configuration as the command/address generator 1802 and may generate a first command/address reference signal CA_Ref1, identical to the command/address signal CA generated by the command/address generator 1802.

The first command/address reference signal CA_Ref1 may be provided to the register 1804. In addition, the first command/address reference signal CA_Ref1 may be transmitted to the CA_REF line through the data output unit 1812 and may be provided to the memory device 1900 through the CA_REF line.

The register 1804 may store the first command/address reference signal CA_Ref1. The comparator 1806 may compare the first command/address reference signal CA_Ref1, stored in the register 1804, with a third command/address reference signal CA_Ref3 output from the data input unit 1810. The comparator 1804 may compare data of the first command/address reference signal CA_Ref1 with data of the third command/address reference signal CA_Ref3 to generate a pass or fail signal P/F.

The phase/timing controller 1808 may generates a control signal CTR indicating a phase shift of the command/address signal CA according to the pass or fail signal P/F of the comparator 1806. The control signal CTR may adjust a phase or timing of the command/address signal CA to generate a phase-adjusted command/address signal CA.

The data input unit 1810 may receive a second command/address reference signal CA_Ref2, transmitted through the CA_REF line or CA reference bus, from the memory device 1900 and may transmit the second command/address reference signal CA_Ref2 to the comparator 1806 as the third command/address reference signal CA_Ref3. The data output unit 1812 may receive the first command/address reference signal CA_Ref1, generated by the command/address reference generator 1803, and transmit the first command/address reference signal CA_Ref1 to the CA reference bus.

The memory device 1900 may include a clock buffer 1902, a command/address (CA) receiver 1904, a command/address reference receiver 1906, and/or data input/output units 1908 and 1910. The clock buffer 1902 may receive a clock signal CK, transmitted through a clock signal line, to generate an internal clock signal ICK. The CA receiver 1904 may receive a chip select signal /CS, a clock enable signal CKE, and a command/address signal CA, transmitted through a CA bus, in response to the internal clock signal ICK.

The clock enable signal CKE may be used as a pseudo command acting as a read command of the command/address signal CA transmitted through the CA bus. The CA receiver 1904 may receive the command/address signal CA when the clock enable signal CKE is activated.

The data input unit 1908 may receive the first command/address reference signal CA_Ref1, transmitted through the CA reference bus, from the controller 1800 and may transmit the first command/address reference signal CA_Ref1 to the command/address reference receiver 1906. The command/address reference receiver 1906 may have the same configuration as the CA receiver 1904. The command/address reference receiver 1906 may receive the chip select signal /CS, the clock enable signal CKE, and the first command/address reference signal CA_Ref1, transmitted through the CA reference bus, in response to an internal clock signal ICK to generate a second command/address reference signal CA_Ref2.

The second command/address reference signal CA_Ref2 may be the same as a signal output from the CA receiver 1904 by receiving the chip select signal /CS, the clock enable signal CKE, and the command/address signal CA, transmitted through the CA bus, in response to the internal clock signal ICK. The second command/address reference signal CA_Ref2 may be transmitted to the CA reference bus through the data output unit 1910.

Hereinafter, CA calibration performed in the memory system 1000 will be described. The CA generator 1802 of the controller 1800 may adjust a phase or timing of the command/address signal CA in response to a control signal CTR of the phase/timing controller 1808 to transmit the command/address signal CA to a CA bus. The command/address reference generator 1803 may generate a first command/address reference signal CA_Ref1, identical to the command/address signal CA, and may transmit the first command/address reference signal CA_Ref1 to a CA reference bus.

The CA reference receiver 1906 of the memory device 1900 may receive the first command/address reference signal CA_Ref1 according to the internal clock signal ICK and the clock enable signal CKE to generate a second command/address reference signal CA_Ref2. The second command/address reference signal CA_Ref2 of the memory device 1900 may be transmitted to the CA reference bus. For example, the second command/address reference signal CA_Ref2 may be transmitted to the CA reference bus by the data output unit 1910.

The controller 1800 may transmit the first command/address reference signal CA_Ref1, transmitted through the CA reference bus, to the comparator 1806 as the second command/address reference signal CA_Ref2. The comparator 1806 may compare data of the first command/address reference signal CA_Ref1 with data of the second command/address reference signal CA_Ref2 to generate a pass or fail signal P/E. The phase/timing controller 1808 may generate a control signal CTR, indicating a phase shift of the command/address signal CA, according to the pass or fail signal P/F of the comparator 1806. The CA generator 1802 may generate a phase-adjusted command/address signal CA according to the control signal CTR.

With the repetition of such a CA calibration operation, the phase/timing controller 1808 of the controller 1800 may determine the middle of locations passed (P) to be the middle of a command/address signal (CA) window, and may generate a command/address signal CA to bring the middle of the command/address signal (CA) window into an edge of the clock signal CK and provide the command/address signal CA to the memory device 1900. Accordingly, the memory device 1900 may receive a command/address signal CA in which the middle of an effective window is disposed on rising/falling edges of a pair of clock signals (e.g., a clock signal pair) CK and CKB on rising/falling edges of the clock signal CK.

The memory system 1000 may include dual-mode transceivers 1820 and 1920 for transmitting and receiving data from and to the controller 1800 and the memory device 1900. In an example embodiment of the present disclosure, each of the dual-mode transceivers 1820 and 1920 may select one of a non-to-zero (NRZ) mode and a pulse amplitude modulation level-4 (PAM4) mode through a plurality of data channels DQ in real time, and may transmit data in the selected mode.

The memory device according to an example embodiment of the present disclosure may be applied to a computing system.

Figure 17:
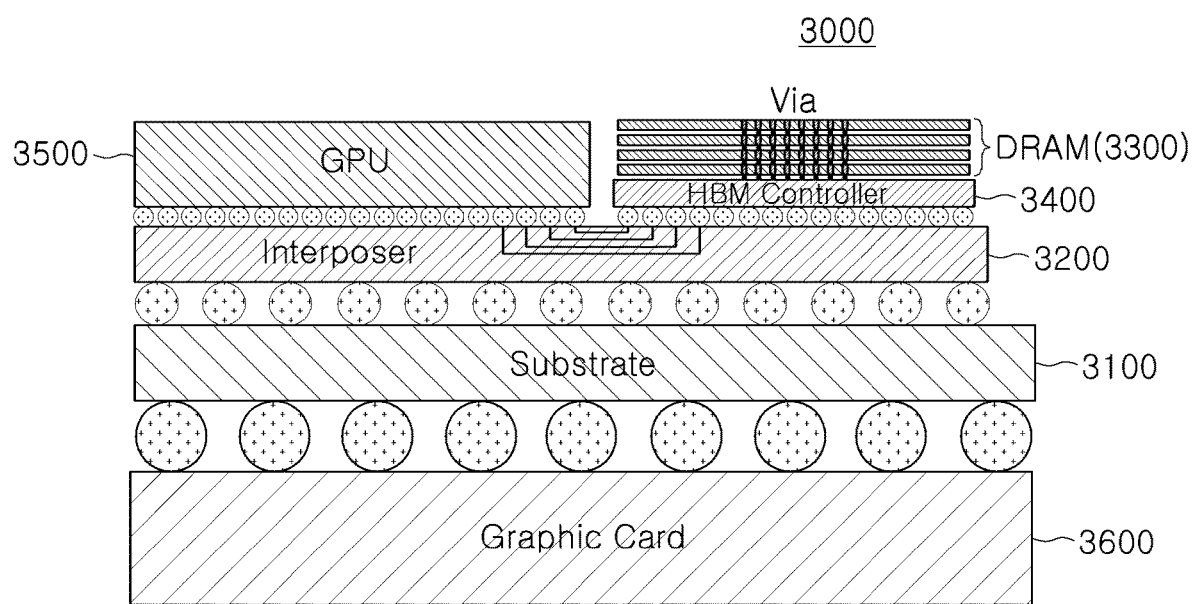
FIG. 17 is a diagram illustrating a graphics card system according to an example embodiment of the present disclosure.

FIG. 17 is a diagram illustrating a graphics card system 3000 according to an example embodiment of the present disclosure.

Referring to FIG. 17, in a graphics card 3600, a GPU 3500 and a stacked DRAM 3300 may be connected to a package substrate 3100 through a silicon interposer 3200. The DRAM 3300 may be connected through a TSV for an HBM controller 3400. The HBM controller 3400 may be connected to the GPU 3500 through the interposer 3200. Each of the DRAM 3300 and the HBM controller 3400 may be configured to perform a scrubbing operation and to report error information, as described in FIGS. 2 to 12.

Figure 18:
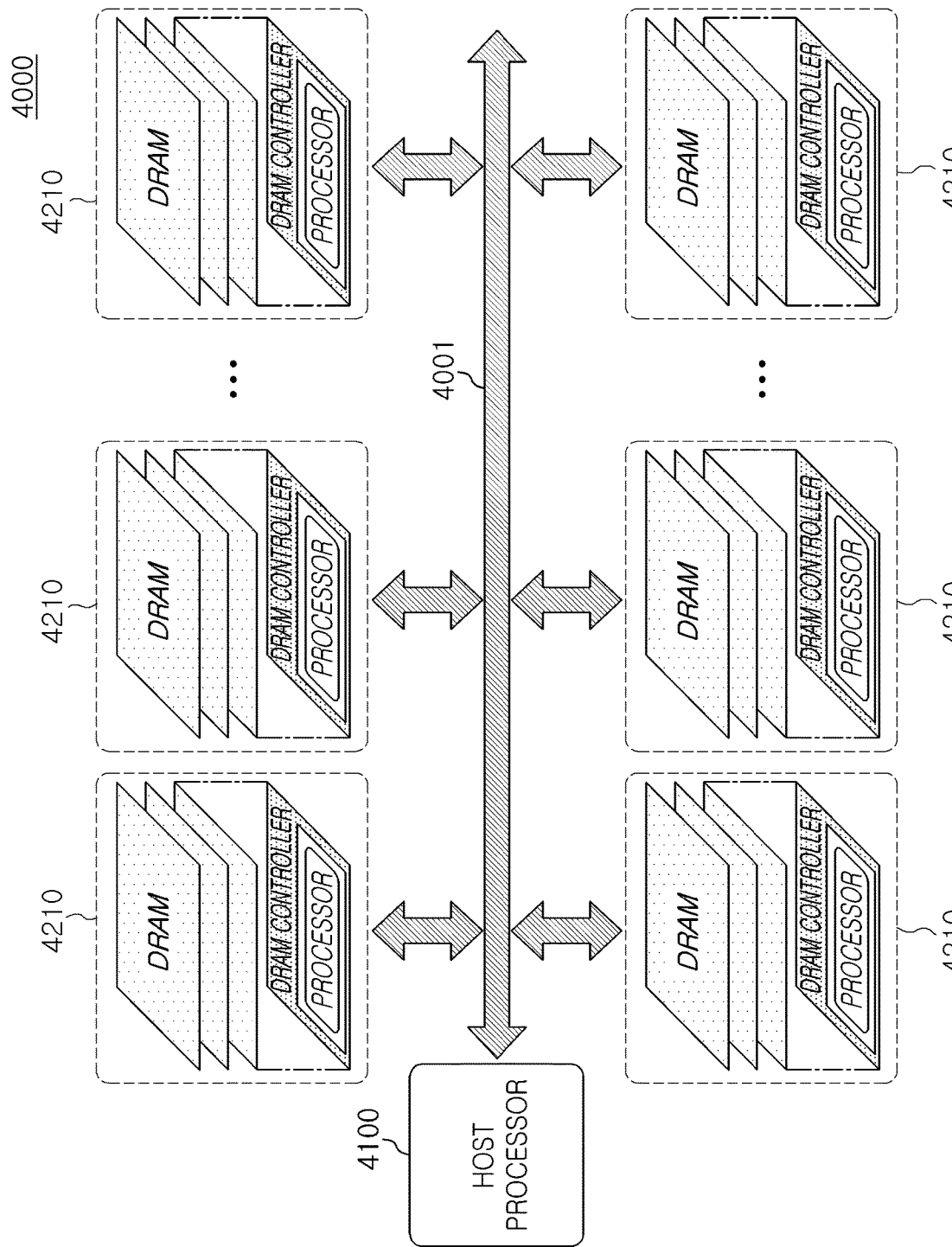
FIG. 18 is a diagram illustrating a computing system according to another example embodiment of the present disclosure.

FIG. 18 is a diagram illustrating a computing system according to another example embodiment of the present disclosure. Referring to FIG. 18, a computing system 4000 may include a host processor 4100 and/or at least one memory package chip 4210 controlled by the host processor 4100. In example embodiments of the present disclosure, the host processor 4100 and the memory package chip 4210 may transmit and receive data through a channel 4001. The memory package chip 4210 may include stacked memory chips and a controller chip. As illustrated in FIG. 18, the memory package chip 4210 may include a plurality of DRAM chips formed on a DRAM controller chip including a processor. As described with reference to FIGS. 2 to 12, a scrubbing operation according to an ECS mode operation and a reporting operation of an error address according to the scrubbing operation may be implemented between the memory chips of the memory package chip 4210 and the controller chip.

It will be understood that a configuration of the memory package chip according to example embodiments of the present disclosure is not limited thereto.

The data communications method according to exemplary embodiments of the present disclosure may be applied to a data center.

Figure 19:
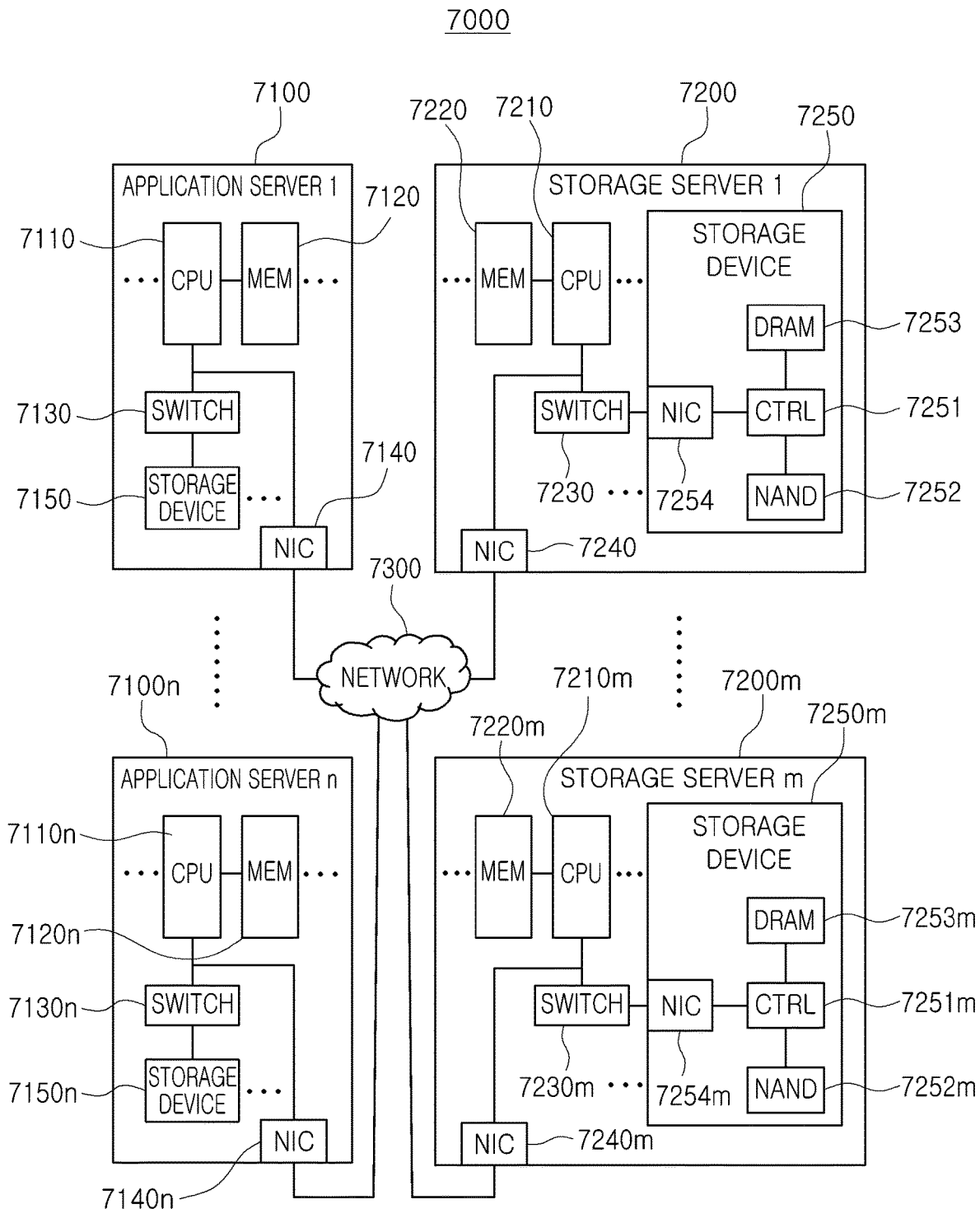
FIG. 19 is a diagram illustrating a data center to which a memory device according to an example embodiment of the present disclosure is applied.

FIG. 19 is a diagram illustrating a data center to which a memory device according to an example embodiment of the present disclosure is applied. Referring to FIG. 19, a data center 7000 is a facility, collecting various types of data and providing services, and may also be referred to as a data storage center. The data center 7000 may be a system for managing a search engine and database, and may be a computing system used in a company such as a bank or (an organization such as) a government agency. The data center 7000 may include application servers 7100 to 7100*n* and/or storage servers 7200 to 7200*m*. The number of application servers 7100 to 7100*n* and the number of storage servers 7200 to 7200*m* may be variously selected according to example embodiments of the present disclosure, and the number of application servers 7100 to 7100*n* and storage servers 7200 to 7200*m* may be different from each other.

The application server 7100 or the storage server 7200 may include at least one of processors 7110 and 7210 and memories 7120 and 7220. To describe the storage server 7200 as an example, the processor 7210 may control overall operation of the storage server 7200 and may access the memory 7220 to execute a command and/or data loaded in the memory 7220. The memory 7220 may be a double data rate synchronous DRAM (DDR SDRAM), a high bandwidth memory (HBM), a hybrid memory cube (HMC), a dual in-line memory module (DIMM), an optane DIMM, or a non-volatile DIMM (NVMDIMM). According to example embodiments of the present disclosure, the number of the processor 7210 included in the storage server 7200 may be variously selected.

In example embodiments of the present disclosure, the processor 7210 and the memory 7220 may provide a processor-memory pair. In example embodiments of the present disclosure, the number of the processors 7210 and the number of the memories 7220 may be different from each other. The processor 7210 may include a single-core processor or a multi-core processor. The description of the storage server 7200 may be similarly applied to the application server 7100. According to example embodiments of the present disclosure, the application server 7100 may or may not include a storage device 7150. The storage server 7200 may include at least one storage device 7250. The storage device 7250 may enter an ECS mode, as described with reference to FIGS. 2 to 12.

The application servers 7100 to 7100*n* and the storage servers 7200 to 7200*m* may communicate with each other through a network 7300. The network 7300 may be implemented using a fiber channel (FC), an Ethernet, or the like. The FC may be a medium used for data transmission at relatively high speed and may employ an optical switch for providing higher performance/higher availability. The storage servers 7200 to 7200*m* may be provided as a file storage, a block storage, or an object storage according to an access method of the network 7300.

In example embodiments of the present disclosure, the network 7300 may be a storage area network (SAN). For example, the SAN may be an FC-SAN using an FC network and implemented according to an FC protocol (FCP). As another example, the SAN may be an IP-SAN using a TCP/IP network and implemented according to a SCSI over TCP/IP or Internet SCSI (iSCSI) protocol. In example embodiments of the present disclosure, the network 7300 may be a general network such as a TCP/IP network. For example, the network 7300 may be implemented according to a protocol such as an FC over Ethernet (FCoE), a network attached storage (NAS), an NVMe over Fabrics (NVMe-oF), or the like.

Hereinafter, a description will be provided while focusing on the application server 7100 and the storage server 7200. The description of the application server 7100 may be applied to another application server 7100*n*, and the description of the storage server 7200 may be applied to another storage server 7200*m*.

The application server 7100 may store data, requested to be stored by a user or a client, in one of the storage servers 7200 to 7200*m* through the network 7300. In addition, the application server 7100 may obtain data, requested to be read by the user or the client, from one of the storage servers 7200 to 7200*m* through the network 7300. For example, the application server 7100 may be a web server, a database management system (DBMS), or the like.

The application server 7100 may access the memory 7120*n* or the storage device 7150*n* included in another application server 7100*n* through the network 7300, or may access the memories 7200 to 7200*m* or the storage devices or the storage devices 7250 to 7250*m* included in the memory 7220 to 7220*m* through the network 7300. Accordingly, the application server 7100 may perform various operations on data stored in the application servers 7100 to 7100*n* and/or storage servers 7200 to 7200*m*. For example, the application server 7100 may execute a command to move or copy data between the application servers 7100 to 7100*n* and/or storage servers 7200 to 7200*m*. In some example embodiments of the present disclosure, the data may be moved from the storage servers 7200 to 7200*m* to the storage devices 7250 to 7250*m*, to the storage servers 7200 to 7200*m* through the memories 7220 to 7220*m*, or may be directly moved to the memories 7120 to 7120*n* of the application servers 7100 to 7100*n*. Data, moved through the network 7300, may be data encrypted for security or privacy.

To describe the storage server 7200 as an example, the interface 7254 may provide a physical connection between the processor 7210 and a controller 7251 and a physical connection between an NIC 7240 and the controller 7251. For example, the interface 7254 may be implemented by a direct attached storage (DAS) method in which the storage device 7250 is directly connected to an exclusive cable. In addition, for example, the interface 7254 be implemented in various interface techniques such as Advanced Technology Attachment (ATA), Serial ATA (SATA), external SATA (e-SATA), Small Computer Small Interface (SCSI), Serial Attached SCSI (SAS), Peripheral PCI Component Interconnection (PCI express), PCIe (NV express), NVMe (NVM express), IEEE 1394, universal serial bus (USB), secure digital (SD) card, multi-media card (MMC), embedded multi-media card (eMMC), Universal Flash Storage (UFS), Embedded Universal Flash Storage (eUFS), Compact Flash (CF) card interface, and the like.

The storage server 7200 may further include a switch 7230 and an NIC 7240. The switch 7230 may selectively connect the processor 7210 and the storage device 7250 to each other or selectively connect the NIC 7240 and the storage device 7250 to each other under the control of the processor 7210.

In example embodiments of the present disclosure, the NIC 7240 may include a network interface card, a network adapter, and the like. The NIC 7240 may be connected to the network 7300 by a wired interface, a wireless interface, a Bluetooth interface, an optical interface, or the like. The NIC 7240 may include an internal memory, a DSP, a host bus interface, and the like, and may be connected to the processor 7210 and/or the switch 7230 through a host bus interface. The host bus interface may be implemented as one of the above-described examples of the interface 7254. In example embodiments of the present disclosure, the NIC 7240 may be integrated with at least one of the processor 7210, the switch 7230, and the storage 7250.

In the storage servers 7200 to 7200*m* or the application servers 7100 to 7100*n*, the processor may transmit data to the storage devices 7150 to 7150*n* and 7250 to 7250*m* or transmit a command to the memory 7120 to 7120*n* and 7220 to 7220*m* to program or read the data. In some example embodiments of the present disclosure, the data may be error-corrected data corrected through an error correction code (ECC) engine. The data is data subjected to data bus inversion (DBI) or data masking (DM), and may include cyclic redundancy code (CRC) information. The data may be data encrypted for security or privacy.

The storage device 7150 to 7150*m* and 7250 to 7250*m* may transmit a control signal and a command/address signal to the NAND flash memory devices 7252 to 7252*m* in response to a read command received from the processor. Accordingly, when data is read from the NAND flash memory device 7252 to 7252*m*, a read enable signal RE may be input as a data output control signal to output data to a DQ bus. A data strobe DQS may be generated using the read enable signal RE. The command and the address signal may be latched in a page buffer according to a rising edge or a falling edge of a write enable signal WE.

The controller 7251 can control overall operation of the storage device 7250. In example embodiments of the present disclosure, the controller 7251 may include a static random access memory (SRAM). The controller 7251 may write data to the NAND flash 7252 in response to a write command, or may read data from the NAND flash 7252 in response to a read command. For example, the write command and/or the read command may be provided from the processor 7210 in the storage server 7200, the processor 7210*m* in another storage server 7200*m*, or the processors 7110 and 7110*n* in the application servers 7100 and 7100*n*. The DRAM 7253 may temporarily store (buffer) data to be written to the NAND flash 7252 or data read from the NAND flash 7252. In addition, the DRAM 7253 may store metadata. The metadata is user data or data generated by the controller 7251 to manage the NAND flash memory 7252. The storage device 7250 may include a secure element (SE) for security or privacy.

As described above, in a memory device according to example embodiments of the present disclosure, a controller for controlling the same, a memory system including the same, and an operating method of the same, a page offline address may be received from the controller, and error addresses according to a scrubbing operation may be reported after excluding the page offline address. As a result, the same address may be prevented from being reported.

While example embodiments of the present disclosure have been shown and described above, it will be apparent to those of ordinary skill in the art that modifications and variations could be made thereto without departing from the scope of the present inventive concept as set forth by the appended claims.

What is claimed is:

1. A memory device, comprising:
   a memory cell array including a plurality of memory cells disposed at intersections of wordlines and bitlines;
   an error correction circuit configured to read data from the memory cell array and to correct an error in the read data; and
   an error check and scrub (ECS) circuit configured to perform a scrubbing operation on the memory cell array,
   wherein the ECS circuit comprises:
   a first register configured to store an error address; and
   an ECS logic configured to perform the scrubbing operation while operating an ECS address counter from the error address in a first direction or a second direction,
   wherein the error address is removed from the first register when a page offline address is the same as the error address.

2. The memory device of claim 1, wherein the ECS logic includes a scrubbing direction logic configured to determine whether to perform the scrubbing operation while counting up the ECS address counter or counting down the ECS address counter.

3. The memory device of claim 1, wherein the ECS logic randomly stores a plurality of error addresses obtained in the scrubbing operation in the first register.

4. The memory device of claim 3, wherein the ECS logic further includes a random select logic configured to randomly select one of the plurality of error addresses.

5. The memory device of claim 1, wherein the ECS logic stops the scrubbing operation when the error address is detected in the scrubbing operation and resumes the scrubbing operation after the error address is reported to an external device.

6. The memory device of claim 5, further comprising:
   a resuming logic configured to resume the scrubbing operation from the ECS address counter before the scrubbing operation is stopped.

7. An operating method of a memory device, the operating method comprising:
   receiving error check and scrub (ECS) mode information from a controller;
   receiving a page offline address from the controller;
   performing a scrubbing operation in response to the ECS mode information; and
   reporting an error address detected in the scrubbing operation to the controller,
   wherein the page offline address is excluded from error addresses detected in the scrubbing operation and the scrubbing operation is performed after excluding a range corresponding to the page offline address.

8. A memory system, comprising:
   a memory device; and
   a controller configured to control the memory device, to receive an error address from the memory device, and to transmit a mapped-out page offline address to the memory device,
   wherein the memory device includes a memory cell array, an error correction circuit configured to read data from the memory cell array and to correct an error in the read data, and an error check and scrub (ECS) circuit including a first register, configured to perform a scrubbing operation on the memory cell array and to store an error address detected in the scrubbing operation, and a second register configured to store the page offline address from the controller.

9. The memory system of claim 8, wherein the ECS circuit further comprises:
   a scrubbing direction logic configured to determine a direction in which the scrubbing operation is performed;
   a random select logic configured to randomly select one error address, among error addresses detected in the scrubbing operation; and
   a resuming logic configured to resume an ECS address counter after the error address is reported.

10. The memory system of claim 8, wherein the ECS circuit reports an error address, except for the page offline address, to the controller.

11. The memory system of claim 8, wherein the ECS circuit performs the scrubbing operation after excluding a range corresponding to the page offline address.

12. The memory system of claim 8, wherein the second register is larger than the first register.

\* \* \* \* \*